US010425326B2

(12) United States Patent
Klincewicz et al.

(10) Patent No.: US 10,425,326 B2
(45) Date of Patent: *Sep. 24, 2019

(54) REROUTING TUNNEL TRAFFIC IN COMMUNICATION NETWORKS

(71) Applicant: AT&T Intellectual Property I, L.P., Atlanta, GA (US)

(72) Inventors: John Gregory Klincewicz, Wayside, NJ (US); Gagan Choudhury, Jackson, NJ (US); Kathleen S. Meier-Hellstern, Cranbury, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/960,147

(22) Filed: Apr. 23, 2018

(65) Prior Publication Data

US 2018/0241663 A1   Aug. 23, 2018

Related U.S. Application Data

(63) Continuation of application No. 14/508,699, filed on Oct. 7, 2014, now Pat. No. 9,954,770.

(51) Int. Cl.
*H04L 12/703* (2013.01)
*H04L 12/707* (2013.01)
(Continued)

(52) U.S. Cl.
CPC .......... *H04L 45/28* (2013.01); *H04L 43/0817* (2013.01); *H04L 45/22* (2013.01); *H04L 47/41* (2013.01)

(58) Field of Classification Search
CPC ..... H04L 43/0805; H04L 45/22; H04L 45/28; H04L 47/41
See application file for complete search history.

(56) References Cited

U.S. PATENT DOCUMENTS 5,146,452 A    9/1992   Pekarske
5,848,143 A   12/1998   Andrews et al.
(Continued)

OTHER PUBLICATIONS

Kawamura, Ryutaro, "Architectures for ATM Network Survivability", Communications Surveys & Tutorials, IEEE 1.1, <www.comsoc.org/pubs/surveys>, vol. 1 No. 1, 1998 (10 pages).

(Continued)

*Primary Examiner* — Rhonda L Murphy
(74) *Attorney, Agent, or Firm* — Hanley, Flight & Zimmerman, LLC

(57) ABSTRACT

Methods, apparatus, systems and articles of manufacture (e.g., physical storage media) to reroute tunnel traffic in a network are disclosed. Example methods disclosed herein include, in response to detecting an event associated with routing first traffic in the network, determining a plurality of paths to carry respective traffic for a plurality of tunnels between pairs of routers in the network, the plurality of paths being determined based on a quality metric characterizing an aggregate tunnel bandwidth to be carried by the plurality of paths for the plurality of tunnels. Such disclosed example methods also include sending first routing information describing the plurality of paths to the routers in the network to cause the routers to route the respective traffic for the plurality of tunnels using the plurality of paths.

20 Claims, 15 Drawing Sheets

(51) Int. Cl.
*H04L 12/891* (2013.01)
*H04L 12/26* (2006.01)

(56) References Cited

U.S. PATENT DOCUMENTS

| | | | |
|---|---|---|---|
| 6,031,819 | A | 2/2000 | Croslin |
| 6,226,684 | B1 | 5/2001 | Sung et al. |
| 6,571,285 | B1 | 5/2003 | Groath et al. |
| 7,039,009 | B2 | 5/2006 | Chaudhuri et al. |
| 7,075,889 | B2 | 7/2006 | Shiozawa |
| 7,346,277 | B2 | 3/2008 | Atkinson et al. |
| 7,406,030 | B1 | 7/2008 | Rijsman |
| 7,551,553 | B2 | 6/2009 | Chaudhuri |
| 7,590,048 | B2 | 9/2009 | Doukai |
| 7,593,321 | B2 * | 9/2009 | Galand .............. H04L 1/22 370/218 |
| 7,664,014 | B2 | 2/2010 | Schoeneberger et al. |
| 7,859,993 | B1 | 12/2010 | Choudhury et al. |
| 8,200,839 | B1 | 6/2012 | Aysan et al. |
| 8,612,616 | B2 | 12/2013 | Koning et al. |
| 8,750,706 | B2 | 6/2014 | Boertjes et al. |
| 9,954,770 | B2 | 4/2018 | Klincewicz et al. |
| 2004/0107382 | A1 | 6/2004 | Doverspike et al. |
| 2005/0240797 | A1 | 10/2005 | Orava et al. |
| 2007/0283042 | A1 | 12/2007 | West et al. |
| 2013/0010589 | A1 | 1/2013 | Kini et al. |
| 2013/0051224 | A1 | 2/2013 | Vasseur et al. |
| 2013/0259058 | A1 | 10/2013 | Vairavakkalai |
| 2013/0336108 | A1 | 12/2013 | Vasseur et al. |

OTHER PUBLICATIONS

Koponen, Teemu, et al., "Onix: A Distributed Control Platform for Larger-scale Production Networks." OSDI. vol. 10, 2010 (14 pages).

Liu, Vincent, et al., "F10: A Fault-Tolerant Engineered Network." USENIX Symposium on Networked Systems Design and Implementation, 2013 (14 pages).

Semin, Sim, et al., "Seamless IP Mobility Support for Flat Architecture Mobile WiMAX Networks", Communications Magazine, IEEE 47.6, 2009 (pp. 142-148).

Yu, Minlan, et al., "Scalable Flow-Based Networking with DIFANE", ACM SIGCOMM Computer Communication Review 40.4, 2010 (pp. 351-362).

Chiu, Angela L., et al., "Network Design and Architectures for Highly Dynamic Next-Generation IP-Over-Optical Long Distance Networks", Journal of Lightwave Technology, vol. 27, No. 12, Jun. 15, 2009 (13 pages).

Santiago Alvarez, "Multiprotocol Label Switching Traffic Engineering Technology Overview", ciscopress.com, Sep. 22, 2006 (13 pages).

McKeown, Nick, et al., "OpenFlow: Enabling Innovation in Campus Networks", Mar. 14, 2008 (6 pages).

G. L. Choudhury, "Models for IP/MPLS routing performance: Convergence, fast reroute and QoS impact," in Keynote Presentation, SPIE Conference on Performance, QoS and Control of Next-Generation Communication Networks (ITCOM), Philadelphia, PA, SPIE vol. 5598, Oct. 2004 (12 Pages).

R. K. Ahuja, T. L. Magnanti, and J. B. Orlin, "Shortest Paths: Label Correcting Algorithms," Chapter 5 in Network Flows: Theory, Algorithms and Applications, Prentice-Hall, New Jersey, 1993 (33 pages).

United States Patent and Trademark Office, "Notice of Allowance," issued in connection with U.S. Appl. No. 14/508,699, dated Dec. 12, 2017, 13 pages.

United States Patent and Trademark Office, "Final Office Action," issued in connection with U.S. Appl. No. 14/508,699, dated Jun. 28, 2017, 16 pages.

United States Patent and Trademark Office, "Non-Final Office Action," issued in connection with U.S. Appl. No. 14/508,699, dated Oct. 20, 2016, 13 pages.

United States Patent and Trademark Office, "Final Office Action," issued in connection with U.S. Appl. No. 14/508,699, dated Jun. 28, 2016, 11 pages.

United States Patent and Trademark Office, "Non-Final Office Action," issued in connection with U.S. Appl. No. 14/508,699, dated Feb. 12, 2016, 15 pages.

* cited by examiner

REROUTING TUNNEL TRAFFIC IN COMMUNICATION NETWORKS

RELATED APPLICATION

This patent arises from a continuation of U.S. patent application Ser. No. 14/508,699, (Now U.S. Pat. No. 9,954, 770) which was filed on Oct. 7, 2014. U.S. patent application Ser. No. 14/508,699 is hereby incorporated herein by reference in its entirety. Priority to U.S. patent application Ser. No. 14/508,699 is hereby claimed.

FIELD OF THE DISCLOSURE

This disclosure relates generally to communication networks and, more particularly, to rerouting tunnel traffic in communication networks.

BACKGROUND

Communication networks, such as Internet Protocol (IP) networks, typically include sets of routers, or other network nodes, interconnected by sets of communication links. In some such networks, such as IP networks employing the multi-protocol label switching—traffic engineering (MPLS-TE) protocol, packets of data, commonly referred to as traffic, are transmitted between pairs of endpoint routers over tunnels implemented using the communication links. In general, a tunnel between a pair of endpoint routers is implemented using a group of one or more communication links referred to as a path. Because network elements, such as the routers and links, can fail, networks often employ one or more rerouting procedures to reroute tunnels over alternate paths to restore service after a failure is detected.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
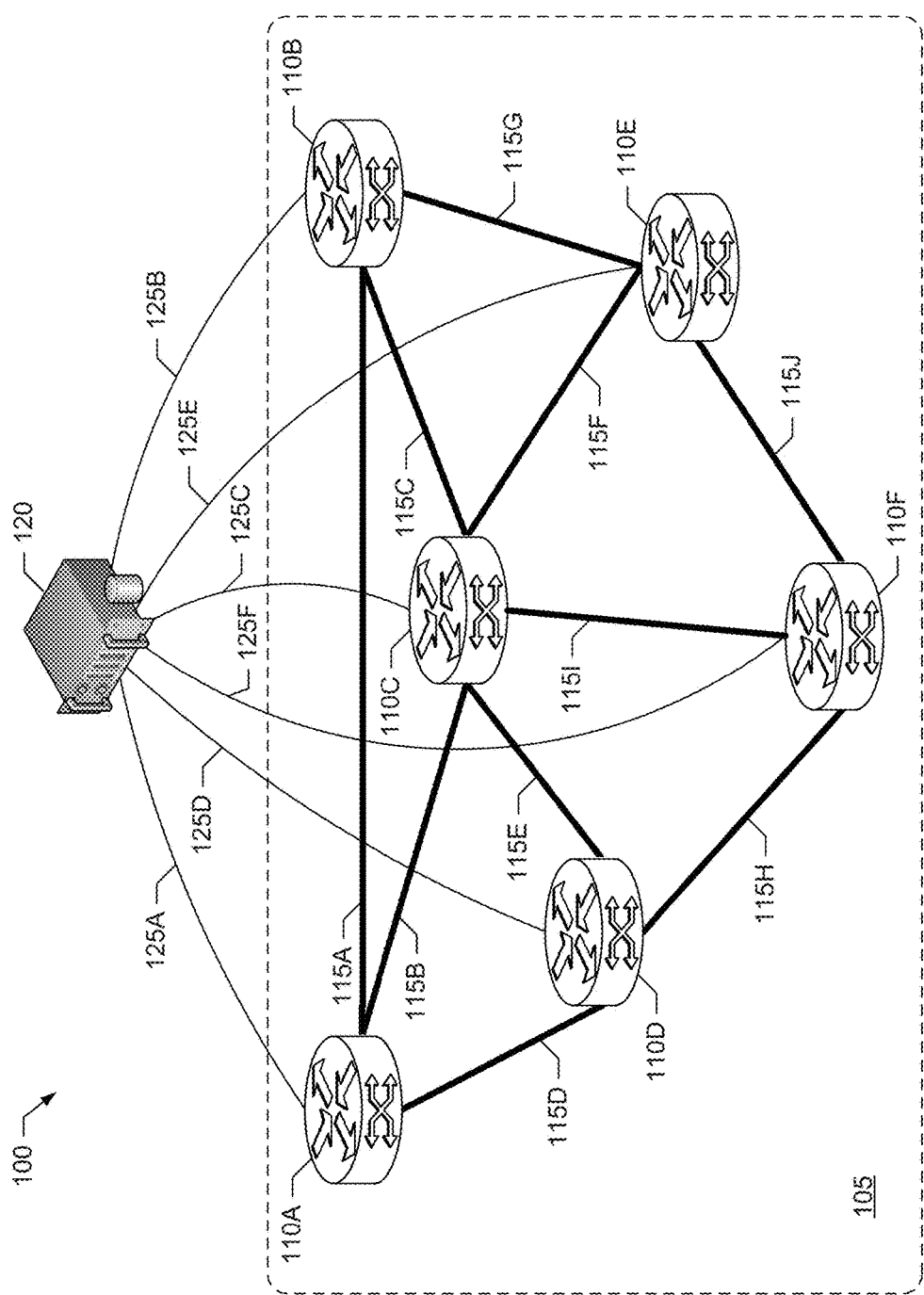
FIG. 1 is a block diagram of an example system to reroute tunnel traffic in an example communication network in accordance with the teachings of this disclosure.

Methods, apparatus, systems and articles of manufacture (e.g., physical storage media) to reroute tunnel traffic in a network are disclosed herein. Some example methods to reroute tunnel traffic disclosed herein include, in response to detecting an event associated with routing first traffic in a network (e.g., such as a router failure, a link failure, a change in traffic load, etc.), determining a set of paths to carry respective traffic for a set of tunnels between pairs of routers in the network. In some examples, the set of paths are determined based on a quality metric characterizing an aggregate tunnel bandwidth to be carried by the set of paths for the set of tunnels. Some such disclosed example methods also include sending first routing information describing the set of paths to the routers in the network to cause the routers to route the respective traffic for the set of tunnels using the set of paths. In some examples, at least some of the first routing information is to replace second routing information previously determined at a first one of the routers in response to the event associated with routing the first traffic.

For example, and as disclosed in further detail below, respective tunnels in the set of tunnels for which the set of paths is to be determined can have respective target tunnel sizes. For example, the target tunnel sizes may be measured in terms of target traffic bandwidths for the respective tunnels, and may be the same or different for different tunnels. As also disclosed in further detail below, in some examples, a particular path determined for a respective tunnel may have a routing bandwidth supporting the full target size of the tunnel, or just a portion of the target size of the tunnel. In some such examples, the aggregate tunnel bandwidth characterized by the quality metric corresponds to a total amount of tunnel bandwidth supported by (e.g., capable of being carried by) the set of paths determined for the set or tunnels, which may be equal to or different from (e.g., less than) a total of the respective target tunnel sizes for the tunnels included in the set of tunnels.

In some disclosed example methods, determining the set of paths for the set of tunnels includes determining a first set of candidate paths to carry the respective traffic for the set of tunnels. Such example methods also include determining a first value of the quality metric representing a first aggregate tunnel bandwidth carried by the first set of candidate paths. Such example methods further include determining the first routing information to describe the first set of candidate paths when the first value of the quality metric corresponds to a sum of the respective target tunnel sizes associated with the tunnels in the set of tunnels.

In some such disclosed example methods, when the first value of the quality metric does not correspond to (e.g., is less than) the sum of the respective target tunnel sizes associated with the tunnels in the set of tunnels, determining the set of paths for the set of tunnels further includes determining a second set of candidate paths to carry the respective traffic for the set of tunnels. Such example methods also include determining a second value of the quality metric representing a second aggregate tunnel bandwidth carried by the second set of candidate paths. Such example methods further include determining the first routing information to describe the second set of candidate paths when (1) the second value of the quality metric does not correspond to (e.g., is less than) the sum of the respective tunnel sizes associated with the tunnels in the set of tunnels and (2) the second value of the quality metric exceeds the first value of the quality metric.

In some such disclosed example methods, the first set of candidate paths is determined based on a first ordering of the set of tunnels, and the second set of candidate paths is determined based on a second ordering of the set of tunnels different from the first ordering of the set of tunnels.

Additionally or alternatively, in some such disclosed example methods, determining the first set of candidate paths includes determining whether a first candidate path capable of supporting a target tunnel size associated with a first tunnel in the set of tunnels is available in the network. In response to determining that the first candidate path is available, some such example methods also include setting a routed bandwidth value for the first tunnel equal to the target tunnel size, and decreasing available link capacities of a first set of network links included in the first candidate path by the target tunnel size. However, in response to determining that the first candidate path is not available, some such disclosed example methods further include determining whether a second candidate path capable of supporting a portion (e.g., fraction) of the target tunnel size associated with the first tunnel is available in the network. In response to determining the second candidate path is available, some such example methods further include setting the routed bandwidth value for the first tunnel equal to that portion (e.g., fraction) of the target tunnel size, and decreasing available link capacities of a second set of network links included in the second candidate path by that portion (e.g., fraction) of the target tunnel size. Furthermore, in some such disclosed example methods, determining the first value of the quality metric for the first set of candidate paths includes increasing the first value of the quality metric by the routed bandwidth value for the first tunnel.

In some example tunnel traffic rerouting methods disclosed herein, the set of tunnels undergoing rerouting corresponds to a first set of target tunnels being evaluated during a first processing iteration, and the set of paths corresponds to a first set of candidate paths determined during the first processing iteration. For example, some such disclosed example methods include accessing state information reported by the routers to determine respective amounts of traffic to be supported between the pairs of the routers in the network for different classes of service, and processing the state information and a largest tunnel size parameter to determine the first set of target tunnels to be examined during the first processing iteration. Some such example methods also include determining a tunnel ordering for the first processing iteration, and determining the first set of candidate paths during the first processing iteration based on the tunnel ordering. In some such examples, the first set of target tunnels and the first set of candidate paths are included in a first rerouting solution associated with a first value of the quality metric. Some such example methods then include varying the tunnel ordering and/or the largest tunnel size parameter among subsequent processing iterations to determine different rerouting solutions including different sets of target tunnels to carry the respective traffic between the pairs of the routers in the network for the different classes of service, with the different sets of target tunnels being implemented using respective different sets of candidate paths. In some such examples, the different rerouting solutions are associated with different values of the quality metric. Thus, some such example methods further include selecting, based on the different values of the quality metric, one of the rerouting solutions to be used to determine the first routing information to be sent to the routers in the network.

These and other example methods, apparatus, systems and articles of manufacture (e.g., physical storage media) to implement rerouting of tunnel traffic in a network are disclosed in greater detail below.

As noted above, communication networks, such as IP networks, employ one or more rerouting procedures to reroute tunnels over alternate paths to restore service after a failure event is detected. For example, in prior IP networks employing the MPLS-TE protocol, it is possible to implement a two-phase approach to failure restoration. The first phase (referred to herein as Phase 1) involves each affected router (e.g., each router having a tunnel affected by the failure event) performing a fast switchover to a pre-computed backup tunnel that temporarily routes the tunnel traffic around the failed element. This is known as Fast ReRoute (FRR). The second phase involves each affected router performing a reroute of its own tunnel(s) based on a current state of the network. As such, the rerouting procedure performed during the second phase (referred to herein as Phase 2) is considered a distributed rerouting procedure because each affected router performs a reroute of its own tunnel(s) using only local information concerning the network's state that is available at the respective router.

Although able to reroute tunnel traffic, such prior tunnel rerouting approaches exhibit several technical problems. For example, in both the FRR procedure (e.g., Phase 1) and the distributed rerouting procedure (e.g., Phase 2) described above, each router reroutes its affected tunnel(s) on its own (e.g., in a distributed manner) without considering the rerouting requirements of other routers in the network. Accordingly, in such prior procedures, the individual routers compete for limited resources (e.g., the network bandwidth available on the network's communication links), which may cause some tunnels to be rerouted at the expense of other tunnels in the network. For example, a first router that completes Phase 2 rerouting before a second router may be able to reroute a first tunnel to a path having sufficient bandwidth to support the full size of the first tunnel, whereas the second router may be left to reroute a second tunnel to a path which has a remaining bandwidth capable of supporting just a small fraction of the full size of the second tunnel. Also, in such prior tunnel rerouting approaches, tunnels not affected by the failure event are typically not considered for rerouting, which may leave limited options for rerouting those tunnel(s) affected by the failure event.

Example tunnel traffic rerouting solutions disclosed herein provide technical solutions to one or more of the technical problems associated with the prior rerouting procedures described above. Such disclosed example rerouting solutions may be implemented as stand-alone rerouting procedures, or in combination with one or more other rerouting procedures. For example, some disclosed example traffic rerouting solutions disclosed herein can be implemented as a third phase (referred to herein as Phase 3) centralized rerouting procedure to be used in conjunction with the Phase 1 and/or Phase 2 procedures described above.

As disclosed in further detail below, to solve the technical problems associated with prior rerouting techniques, example tunnel traffic rerouting solutions disclosed herein employ an example centralized rerouting controller or other apparatus to establish new tunnels between pairs of routers in a network in response to a network failure event and/or other detected network routing event. In some examples, the new tunnels are determined by the centralized rerouting controller based on evaluating a quality metric characterizing network quality on a global scale (e.g., in terms of an aggregate routed bandwidth over some or all of the network tunnels, or some other global criteria). In some examples, the centralized rerouting controller uses network state information reported by the routers to determine the new tunnels to replace some or all of the existing tunnels in the network, including, in some examples, those tunnels not directly affected by the network failure and/or other detected network routing event. For example, in response to a network failure and/or other detected network routing event, the centralized rerouting controller can determine, as disclosed in further detail below, a set of tunnels, and a corresponding set of paths to carry the traffic for these tunnels, that meets or otherwise has a best (e.g., highest) quality metric for routing traffic globally in the network. In this way, the disclosed example tunnel traffic rerouting solutions implemented by such a centralized rerouting controller are able to avoid the inefficiencies associated with routers (and their associated tunnels) competing for network resources. In some examples, the disclosed example tunnel traffic rerouting solutions implemented by such a centralized rerouting controller are also able to reroute tunnels not directly affected by a failure and/or other detected network routing event, thereby providing more options for rerouting those tunnel(s) that are affected by the failure and/or other network routing event, which may help alleviate network congestion points in the network.

Turning to the figures, a block diagram of an example system 100 to reroute tunnel traffic in an example communication network 105 as disclosed herein is illustrated in FIG. 1. The communication network 105 of the illustrated example includes a set of example routers 110A-F interconnected by an example set of communication links 115A-J. The example routers 110A-F may be implemented by any type(s), number(s) and/or combination(s) of one or more routers, switches, gateways, computers, etc., and/or one or more processing platforms, such as the example processing platform 1000 illustrated in FIG. 10 and described in further detail below. The example communication links 125A-F may be implemented by any type(s), number(s) and/or combination(s) wireless communication links, wired communication links, optical communication links, etc. Additionally or alternatively, the communication links 125A-F may be implemented by one or more physical links, logical links, virtual links, etc., in one or more wireless communication networks, wired communication networks, optical communication networks, etc.

In the illustrated example of FIG. 1, the routers 110A-F route traffic (e.g., data packets) between different pairs of origination and destination routers in the network 105 using the communication links 115A-J. In the example network 105 of FIG. 1, the communication links 115A-J form a partial mesh topology interconnecting the routers 110A-F. In contrast with a full mesh topology, in which each network router is connected with every other network router, in a partial mesh topology, some routers in a partial mesh topology are not directly connected to one another. Thus, in a partial network topology, traffic routed between a pair of origination and destination routers may use a path containing multiple ones of the communication links 115A-J, which is referred to herein as a multi-link path. Furthermore, in some examples, even if a pair of origination and destination routers are directly connected, traffic between the pair of routers may still use a multi-link communication path.

For example, in the example network 105 of FIG. 1, the routers 110A and 110F are not directly connected. Thus, traffic routed between routers 110A and 110F uses a multi-link path, such as the path containing the links 115D and 115H, or the path containing the links 115B and 115I, or the path containing the links 115D, 115E and 115I, etc. Also, in the example network 105 of FIG. 1, the routers 110A and 110B are directly connected by the link 115A and, thus, traffic may be routed between routers 110A and 110B using just the single link 115A. However, in some examples, traffic routed between the routers 110A and 110B may additionally or alternatively use a multi-link path, such as the path containing the links 115B and 115C, or the path containing the links 115B, 115F and 115G, etc.

In the illustrated example of FIG. 1, the network 105 employs a communication protocol, such as the MPLS-TE protocol, that defines tunnels between pairs of the routers 110A-F for routing data between the router pairs. For example, for a given pair of the routers 110A-F, the MPLS-TE protocol may establish one or more tunnels for routing traffic between the routers. In some examples, the tunnels are unidirectional such that, for a given pair of the routers 110A-F, one router is the origination router and the other router is the destination router for traffic being routed in one direction, whereas the origination and destination roles are reversed for traffic being routed in the other direction. Also, in some examples, for a given pair of the routers 110A-F, the MPLS-TE protocol may establish different tunnel(s) for different classes of traffic to be routed between the pair of routers. For example, for a given class of traffic, the MPLS-TE protocol may establish one or several tunnels between a given pair of the routers 110A-F.

For a given tunnel, the pair of routers 110A-F terminating the tunnel are referred to herein as endpoint routers. As described above, the MPLS-TE protocol implements a tunnel between a pair of endpoint routers 110A-F using path containing a group of one or more of the communication links 115A-J. For example, a tunnel between the routers 110A and 110B could be implemented using a first path containing the link 115A, a second path containing the links 115B and 115C, or a third path containing the links 115B, 115F and 115G, etc. As another example, a tunnel between the routers 110A and 110F could be implemented using a first path containing the links 115D and 115H, a second path containing the links 115B and 115I, or a third path containing the links 115D, 115E and 115I, etc.

The example system 100 of FIG. 1 also includes an example centralized rerouting controller 120 to implement one or more example tunnel traffic rerouting solutions according to the teachings of this disclosure. In the illustrated example, the centralized rerouting controller 120 monitors the state of the network 105 by receiving state information reported from the routers 110A-F in the network. To facilitate such monitoring, the system 100 is in communication with the routers 110A-F via respective example communication links 125A-F. The example communication links 115A-J may be implemented by any type(s), number(s) and/or combination(s) wireless communication links, wired communication links, optical communication links, etc. Additionally or alternatively, the communication links 125A-F may be implemented by one or more physical links, logical links, virtual links, etc., in one or more wireless communication networks, wired communication networks, optical communication networks, etc. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In the illustrated example of FIG. 1, the network state information received by the centralized rerouting controller 120 from a given one of the routers 110A-F includes, but is not limited to, traffic volume(s) for the tunnel(s) associated with the given router (e.g., for which the given router is an endpoint), the class(es) of traffic carried by the tunnel(s) associated with the given router, link capacities for the link(s) 115A-J terminated at the given router, etc. The routers 110A-F may report the state information to the centralized rerouting controller 120 via the communication links 125A-F at regular or irregular reporting intervals, based on the occurrence of one or more events (e.g., such as when a storage buffer is full, when a query is received from the centralized rerouting controller 120, etc.), etc., or any combination thereof.

When an event associated with routing traffic (e.g., such as a failure event, an event triggered when a tunnel traffic load exceeding a threshold value) is detected in the network 105 by one or more of the routers 110A-F, the routers(s) that detected the event communicate information concerning the event to the centralized rerouting controller 120 via the communication links 125A-F. For example, such information may specify one or more routers that are no longer available, one or more communication links that are no longer available, one or more tunnels that are affected by the event, etc. In response to the detected event, the centralized rerouting controller 120 performs an example centralized tunnel rerouting procedure in accordance with the teachings disclosed herein to use the network state information previously reported by the routers 110A-F to recompute new tunnels for routing traffic between pairs of the routers 110A-F in the network 105. As described above and in further detail below, the centralized rerouting controller 120 determines the new tunnels, and the paths to carry the traffic for the new tunnels, based on evaluating a quality metric characterizing network quality on a global scale. When the centralized tunnel rerouting procedure is complete, routing information describing the set of paths implementing the new set of tunnels in the network 105 is communicated by the centralized rerouting controller 120 to the routers 110A-F via the communication links 125A-F. In some examples, if advantageous, the centralized rerouting controller 120 may add additional tunnels between some router pairs, delete and/or combine tunnels between some router pairs, etc. For example, by adding more tunnels between a given pair of routers for a particular class of traffic, traffic could be divided among more paths, thus potentially making better use of the available bandwidth.

In some examples, the centralized tunnel rerouting procedure performed by the centralized rerouting controller 120 includes performing an initialization procedure in which different possible values of a maximum tunnel size is specified. Then, the centralized rerouting controller 120 performs several iterations of the centralized tunnel rerouting procedure to determine different sets of target tunnels and associated paths using different values of the maximum tunnel size. During a given processing iteration, the value of the maximum tunnel size specifies the largest tunnel size to be considered by the centralized rerouting controller 120 when determining a tunnel between a pair of endpoint routers. Depending on the particular maximum tunnel size being considered during a given processing iteration, the centralized rerouting controller 120 may establish one or several tunnels between a pair of routers to support the volume of traffic expected for a particular class of service (e.g., as determined from the network state information reported by the routers 110A-F). In some examples, different sets of tunnels are used to carry different classes of service between a pair of routers. Thus, during a first iteration of an example tunnel determination process performed by the centralized rerouting controller 120, the centralized rerouting controller 120 determines an overall set of target tunnels based on (1) a first maximum tunnel size to be considered (e.g., which may be the largest of the specified maximum tunnel sizes) and (2) the traffic load between router pairs in the network for the different supported classes of service (e.g., as determined from the network state information reported by the routers 110A-F).

In some examples, for a set of target tunnels determined during a given processing iteration for a given maximum tunnel size, the centralized rerouting controller 120 then iteratively determines respective paths for the set of target tunnels (e.g., with each path traversing various links 115A-J between the routers 110A-F in the network 105) using different possible orderings of the desired tunnels. For example, the set of target tunnels can be ordered by decreasing class of service, decreasing size of tunnel, distance between origination and destination router, randomly, etc. In some examples, for a given ordering of the overall set of target tunnels, the centralized rerouting controller 120 then examines each target tunnel, in order, to determine a candidate path through the network 105 for the tunnel. In some examples, when determining the candidate path for a given target tunnel, the centralized rerouting controller 120 considers only those links 115A-J with sufficient available capacity to carry the full size of the target tunnel. If such a candidate path for a given target tunnel is found, the available link capacities for the links 115A-J included in the path for the desired tunnel are reduced by the full size of the tunnel. Additionally, a routed bandwidth metric for the target tunnel is set equal to the full size of the tunnel.

In some examples, if a candidate path capable of supporting the full size of a target tunnel is not found, the centralized rerouting controller 120 attempts to again find a candidate path for the target tunnel, but assuming that only a portion of the tunnel's full size (e.g., one-half, one-third, one-fourth, etc., or some other fraction) is to be supported by the determined path. If such a candidate path for the target tunnel is found using the reduced tunnel size, the available link capacities for the links 115A-J included in the path for the target tunnel are reduced by the reduced tunnel size assumed for the target path. Additionally, the routed bandwidth metric for the target tunnel is set equal to the reduced tunnel size assumed for the target path. In some examples, if a candidate path for a target tunnel is not found after a first attempt assuming a first reduced tunnel size for the tunnel, the process is repeated one or more additional times using successively smaller tunnel sizes for the target tunnel. However, if a candidate path for the target tunnel is still not found, the centralized rerouting controller 120 determines that a path for the target tunnel is not available, and the routed bandwidth metric for the target tunnel is set equal to zero.

In some examples, after attempting to find candidate paths for all the target tunnels in the set of target tunnels for a given tunnel ordering, the example centralized rerouting controller 120 determines an overall routing quality metric by combining (e.g., adding) the individual routed bandwidth metrics determined for the respective target tunnels during the current processing iteration. In some examples, if the overall routing quality metric indicates that the full sizes of all target tunnels are supported by the candidate paths determined during the current iteration, the centralized rerouting controller 120 determines that the set of target tunnels and associated candidate paths determined during the current iteration are to be the set of tunnels and associated paths included in a final routing solution responsive to the detected network event. In some such examples, the centralized rerouting controller 120 then indicates that a final routing solution has been found and communicates routing information to the routers 110A-F specifying the set of tunnels and associated paths to be used to carry the respective tunnel traffic for the tunnels.

However, if the overall routing quality metric indicates that the full sizes of all target tunnels are not supported by the candidate paths determined during the current iteration, the centralized rerouting controller 120 then performs, in some examples, other processing iterations using different tunnel orderings for the maximum tunnel size being considered, and then further processing iterations for other specified maximum tunnel sizes, to find a routing solution with the best (e.g., largest) overall routing quality metric. In some such examples, the centralized rerouting controller 120 uses the routing solution with the best overall routing quality metric as the final routing solution, and communicates routing information to the routers 110A-F specifying the set of tunnels and associated paths to be used to carry the respective tunnel traffic for the tunnels.

Examples tunnel traffic rerouting solutions capable of being realized in the example network 105 by the example centralized rerouting controller 120 of FIG. 1 are illustrated in FIGS. 2A-2D. In the illustrated example of FIG. 2A, the network 105 includes two example tunnels 205 and 210. The example tunnel 205 of FIG. 2A routes traffic between the endpoint routers 110A and 110F and is implemented using a first path containing links 115D and 115H. The example tunnel 210 of FIG. 2A routes traffic between the endpoint routers 110B and 110F and is implemented using a second path containing links 115C and 115I.

Figure 2A:
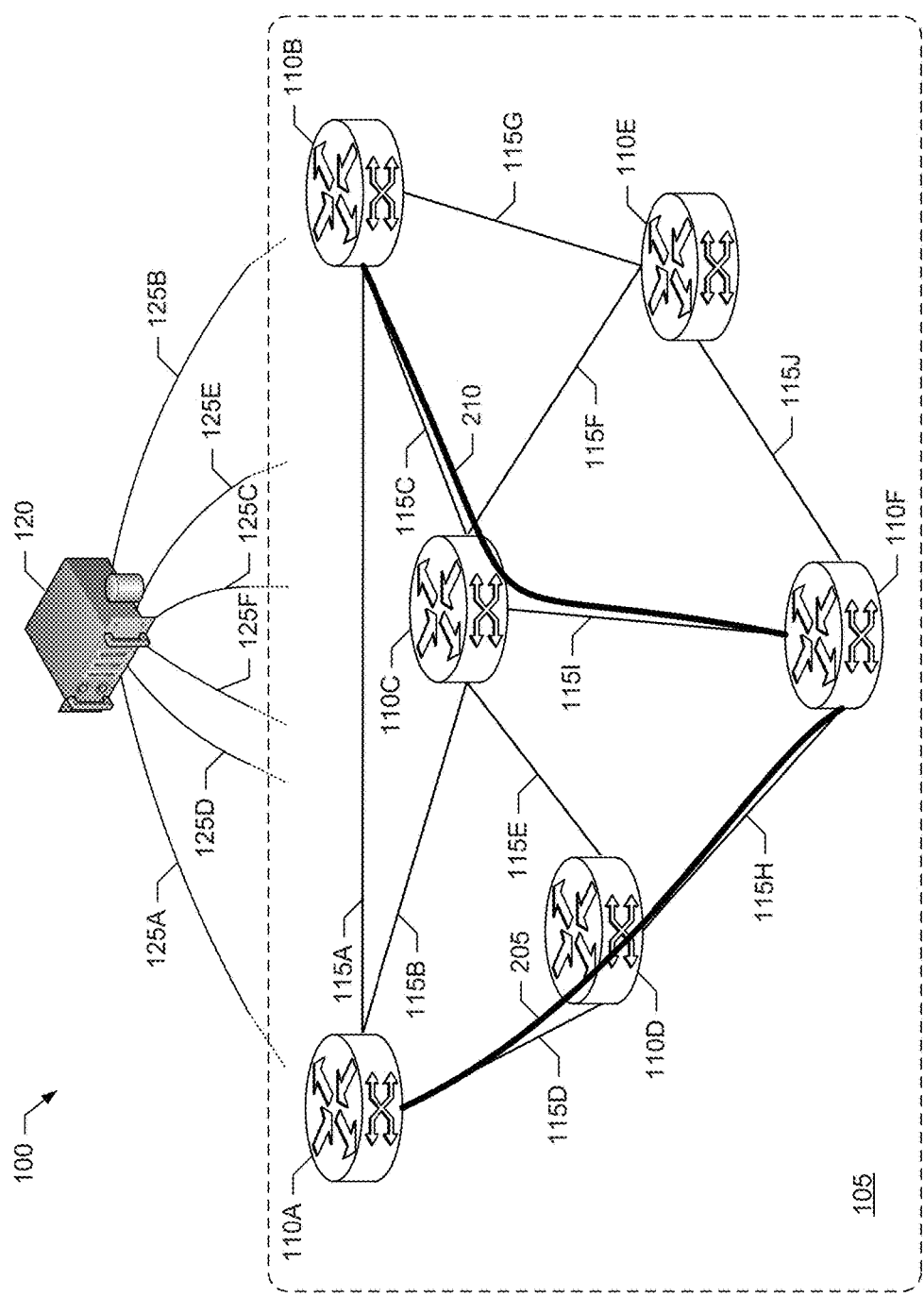
FIGS. 2A-2D collectively illustrate example tunnel traffic rerouting solutions capable of being determined by the example system of FIG. 1.
Figure 2B:
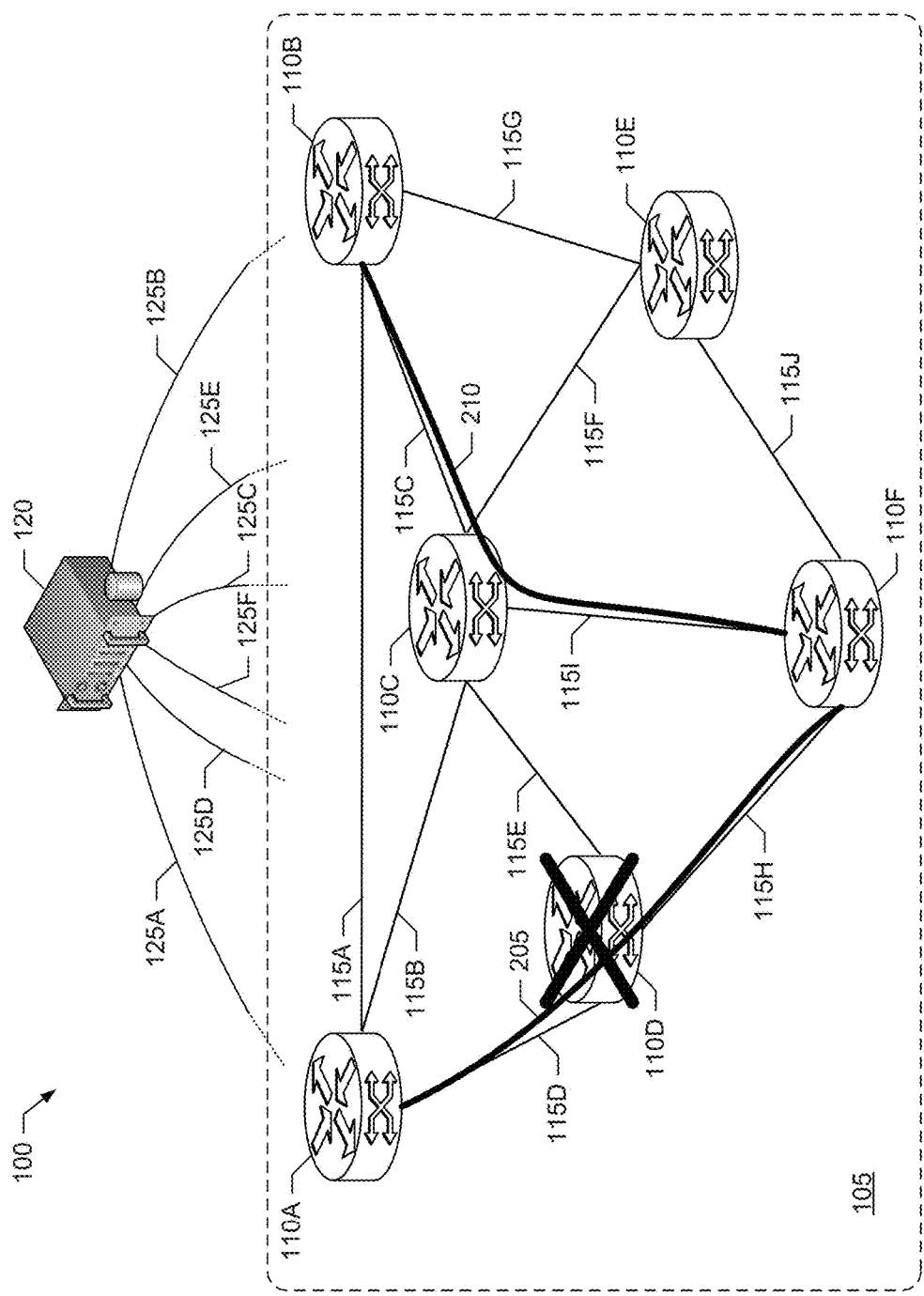

In the illustrated example of FIG. 2B, the router 110D suffers a failure and, as such, the first path containing links 115D and 115H is no longer able to carry traffic for the tunnel 205. In the illustrated example, one or both of the endpoint routers 110A and/or 110F communicate information indicating this event (e.g., router failure) to the example centralized rerouting controller 120. In response, the example centralized rerouting controller 120 determines one or more new tunnels and associated path(s) to reroute the traffic carried by tunnel 205. In some examples, the example centralized rerouting controller 120 also determines one or more new tunnels to carry the respective traffic currently carried by one or more of the other tunnels in the network 105, such as the example tunnel 210.

Figure 2C:
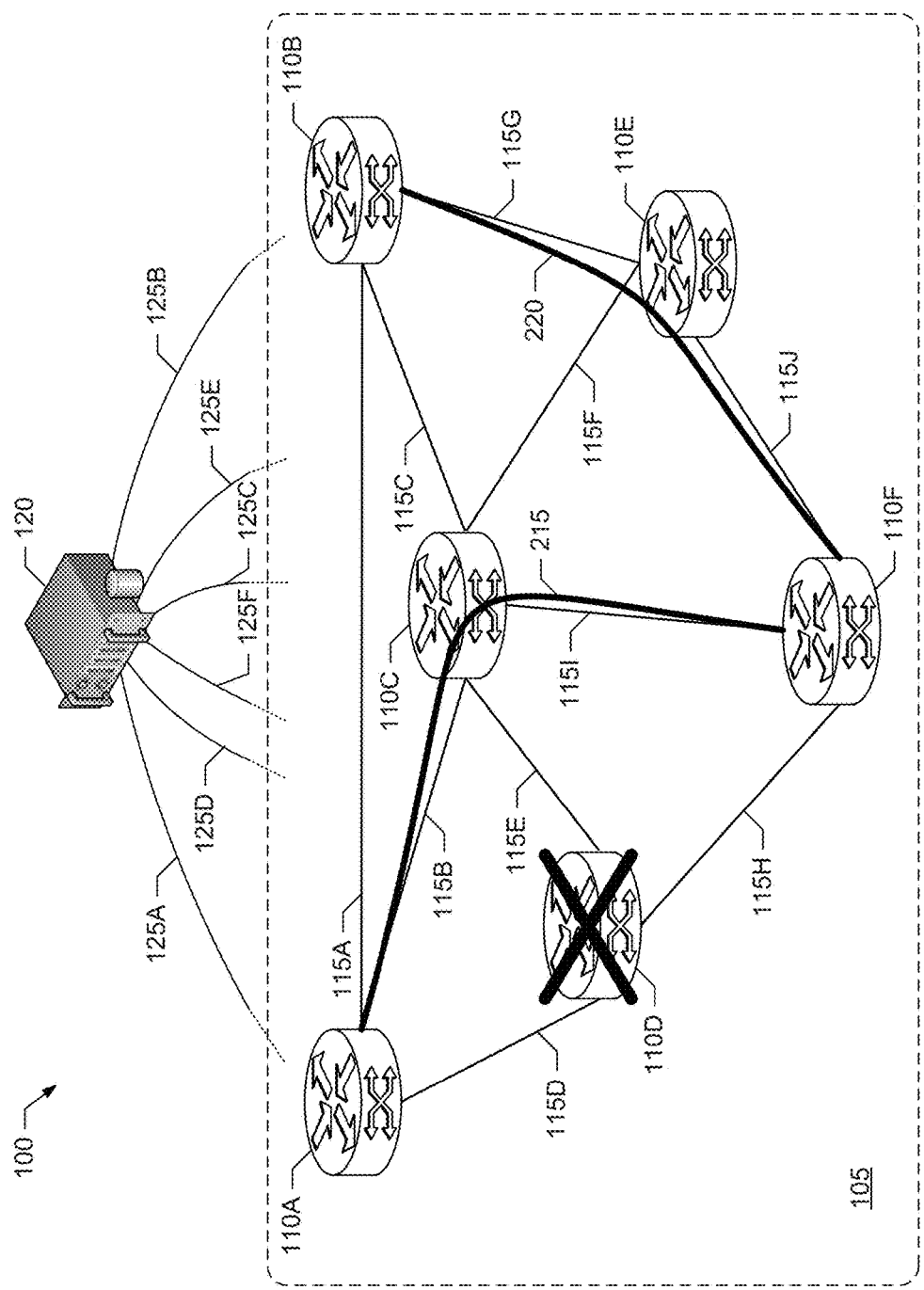

In a first example, and as illustrated in FIG. 2C, the centralized rerouting controller 120 employs an example centralized tunnel rerouting procedure as disclosed herein to determine a first routing solution including a new example tunnel 215 implemented using a path containing the links 115B and 115I to carry the tunnel traffic previously carried by tunnel 205. Additionally, in the example of FIG. 2C, the centralized rerouting controller 120 determines the first routing solution to also include a new example tunnel 220 implemented using a path containing the links 115G and 115J to carry the tunnel traffic previously carried by tunnel 210, even though tunnel 210 was not directly affected by the failure event associated with the router 110D. For example, the rerouting of the traffic for tunnel 205 to tunnel 215 may have reduced the available link capacity of link 115I. In such an example, because the centralized rerouting controller 120 evaluates a quality metric characterizing network quality on a global scale, the centralized rerouting controller 120 can detect that there is insufficient capacity on link 115I, after rerouting the traffic for tunnel 205 to tunnel 215, to also route the traffic associated with tunnel 210. Thus, the centralized rerouting controller 120 determines a new tunnel, the tunnel 220, to route the tunnel traffic previously carried by tunnel 210.

Figure 2D:
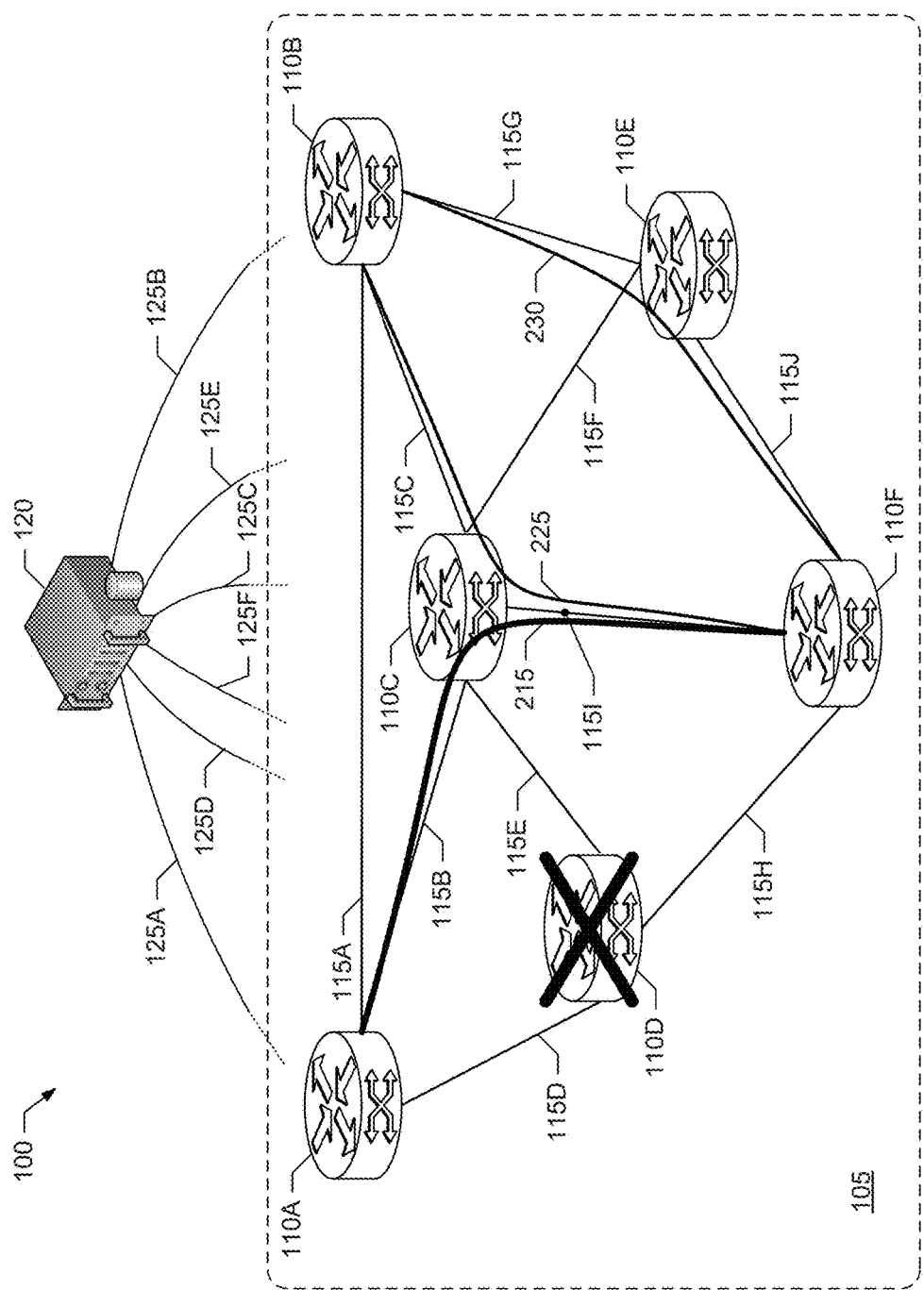

In some examples, based on the maximum tunnel sizes specified for use by the centralized rerouting controller 120, and/or the available link capacities of one or more of the links 115A-J, the centralized rerouting controller 120 determines two or more tunnels to carry the traffic previously associated with one tunnel in the network 105. For example, and as illustrated in FIG. 2D, the centralized rerouting controller 120 may determine a second routing solution in which two new tunnels 225 and 230 between the endpoint routers 110B and 110F are to carry the tunnel traffic previously carried by tunnel 210. In the illustrated example, the tunnel 225 is implemented using a path containing the links 115C and 115I, and the tunnel 230 is implemented using a path containing the links 115G and 115J.

Returning to FIG. 1, in some examples, the centralized rerouting controller 120 performs centralized tunnel rerouting as a stand-alone rerouting procedure for the network 105. In other examples, centralized tunnel rerouting as performed by the centralized rerouting controller 120 is used in combination with one or more other rerouting procedures. For example, and as described above, centralized tunnel rerouting as performed by the centralized rerouting controller 120 can be utilized as Phase 3 of a multi-phase rerouting procedure employing FRR as Phase 1, and a distributed reroute procedure performed locally at the affected routers using information available locally at the routers as Phase 2.

For example, when an event (e.g., a failure event or other event affecting the routing of traffic) is detected by one of the routers 110A-F in the network 105, that router may first implement FRR as Phase 1 of rerouting its tunnel(s) that is(are) affected by the event. In FRR, a router redirects traffic that would have been routed by a tunnel affected by the event to pre-computed backup tunnel. FRR can provide a short-term response to network events, with detection times on the order of 50 milliseconds (ms), and switching times for switching from the affected tunnel to the backup tunnel on the order of 100 ms. However, FRR reroutes traffic to pre-computed backup tunnel(s) without considering whether the pre-computed backup tunnel(s) has(have) sufficient capacity to carry the rerouted tunnel traffic.

For example, and with reference to FIGS. 2A-D, if link 115D in the example network 105 was to fail, and the router 110A receives traffic (e.g., a data packet) that is to be routed to the router 110F via the tunnel 205, then in an example implementation employing FRR as Phase 1 of a multi-phase rerouting procedure, the router 110A would redirect the traffic to a pre-computed backup tunnel around the failed element (e.g., link or router, etc.). For example, the backup tunnel could be a tunnel implemented using the links 115B and 115E, which bypasses the failed link 115D. A backup tunnel of this kind, which handles link failures, is referred to as a Next-Hop type of backup tunnel. A Next-Next-Hop type of backup tunnel refers to a type of backup tunnel that bypasses a router in the case of router failure.

Continuing the preceding example, in parallel or after a router 105A-F performs an initial reroute to a backup tunnel using FRR in Phase 1, the router 105A-F performs a distributed MPLS-TE rerouting procedure as Phase 2 of the multi-phase rerouting procedure. Such a Phase 2 procedure may be a slower rerouting procedure than the FRR procedure performed as Phase 1. Under Phase 2, the origination router 110A-F (also referred to herein as a head end router) of each tunnel affected by the detected network event performs a distributed process of establishing a new, end-to-end tunnel and associated path, based on the current state of the network 105, to route traffic for the affected tunnel. Whereas the FRR process of Phase 1 reroutes tunnel traffic without regard to available link capacity on the backup tunnels, in Phase 2, the new tunnel(s) and associated path(s) is(are) established taking into account the current link capacities and current traffic volumes. However, only those origination router(s) having tunnel(s) directly or indirectly affected by the network event/failure participate in the distributed MPLS-TE rerouting procedure and, as such, only the tunnel(s) directly or indirectly affected by the network event/failure is(are) rerouted. (For example, a tunnel in a higher priority class that is rerouted using the distributed MPLS-TE rerouting procedure could preempt a lower class tunnel and, thus, indirectly affect the lower class tunnel. The lower class tunnel would then have to be rerouted, even though it was not directly affected by the network event/failure.) Furthermore, the link capacity and traffic volume information used by each origination router involved in the distributed MPLS-TE rerouting procedure of Phase 2 is limited to only the local link capacity and traffic volume information available at the particular router.

In some examples in which centralized tunnel rerouting as performed by the example centralized rerouting controller 120 is included in a multi-phase rerouting procedure, the centralized rerouting controller 120 can begin performing routing in parallel with the other rerouting procedures included in the multi-phase approach. For example, if the centralized tunnel rerouting procedure performed by the example centralized rerouting controller 120 is included as Phase 3 in a multi-phase rerouting procedure including Phase 1 and 2 described above, the centralized rerouting controller 120 can start performing Phase 3 as soon it receives a report of a network event. Because the centralized tunnel rerouting procedure of Phase 3 may take longer to complete than Phase 1 and/or Phase 2, the network 105 can reroute tunnel traffic using the Phase 1 and/or Phase 2 solutions until the Phase 3 solution is available.

Although example centralized tunnel traffic rerouting solutions have been disclosed in the context of the example system 100 and example network 105 of FIG. 1, such solutions are not limited thereto. For example, centralized tunnel traffic rerouting as disclosed herein can be employed in any type of network in which traffic is routed using tunnels and paths over any number(s) and/or type(s) of network nodes (e.g., routers) and/or any number(s) and/or type(s) of communication links. Also, example systems utilizing centralized tunnel traffic rerouting as disclosed herein may employ one centralized rerouting controller 120, such as in the example system 100 of FIG. 1, or multiple example centralized rerouting controllers 120. In the latter case, in some examples, different centralized rerouting controllers 120 may be responsible for performing centralized tunnel traffic rerouting for different groups of network nodes (e.g., routers) and/or communication links. Furthermore, although aggregate tunnel bandwidth is used as a quality metric in the above description, other metrics (e.g., such as aggregate traffic latency, aggregate traffic jitter, aggregate traffic loss, etc.) can additionally or alternatively be used by the centralized rerouting controller 120 to characterize the global quality of routing solutions determined for a network, such as the example network 105.

Figure 3:
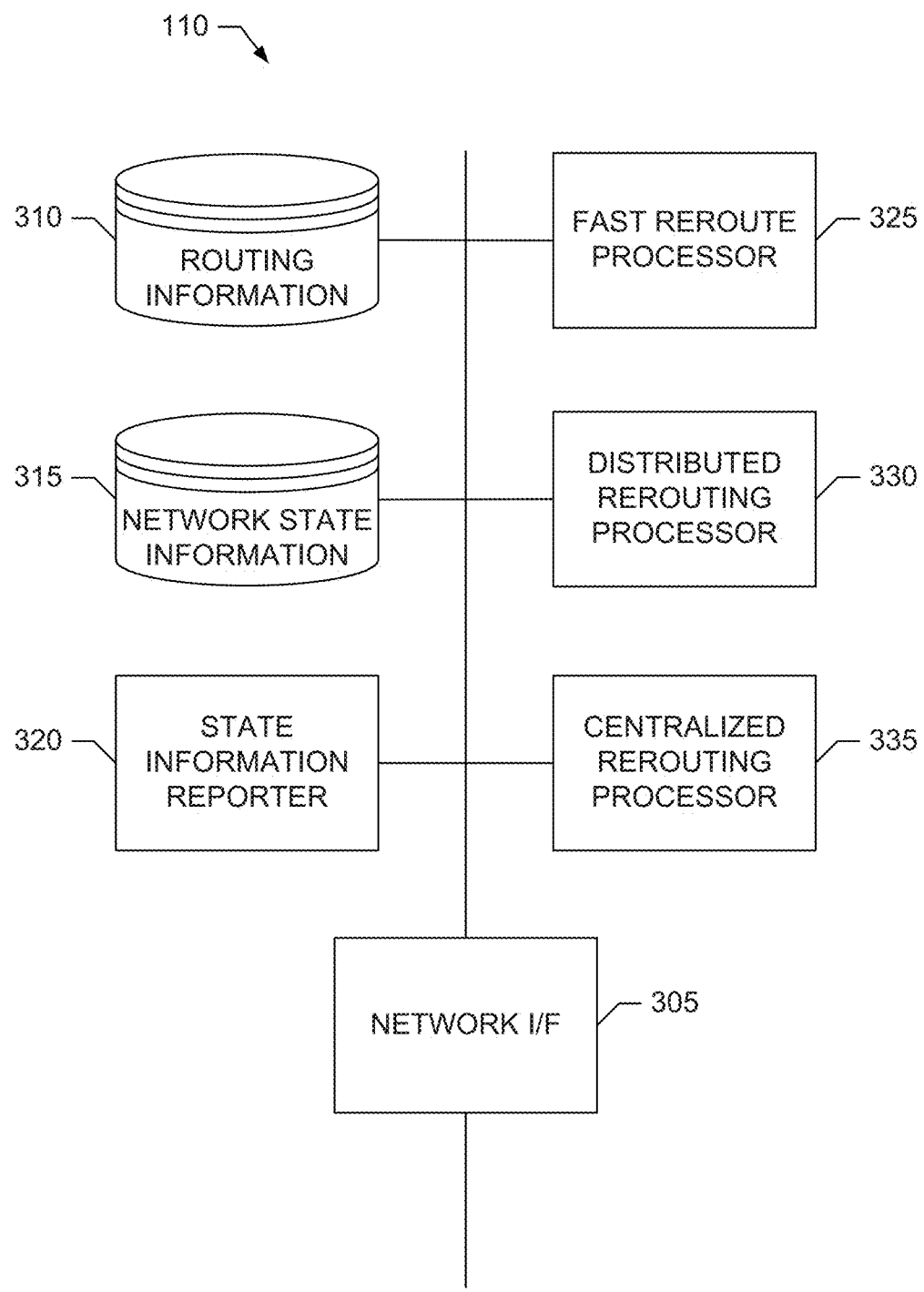
FIG. 3 is a block diagram depicting an example implementation of an example router included in the example network of FIG. 1 and supporting tunnel traffic rerouting as disclosed herein.

A block diagram of an example router 110 that may be used to implement one or more of the example routers 110A-F of FIG. 1 is illustrated in FIG. 3. The block diagram of FIG. 3 illustrates at least some structures associated with implementing tunnel traffic rerouting at the example router 110. Other structures implemented by the router 110 have been omitted for clarity.

The example router 110 of FIG. 3 includes an example network interface 305 to interface the router 110 with one or more communication links, such as one or more of the example links 115A-J and/or the example links 125A-F of FIG. 1. The example network interface 305 can be implemented by any type(s), number(s) and/or combination(s) of network interfaces, such as the example interface circuit 1020 of FIG. 10, which is described in further detail below.

The example router 110 of FIG. 3 also includes include example routing information storage 310 to, for example, store routing information describing the tunnel(s) terminated at the router 110, the path(s) implementing the tunnel(s), the class(es) of traffic to be routed over the tunnel(s) etc. For example, the routing information storage 310 may implement a routing information base (RIB) and/or other routing information storage mechanism for arranging, storing and/or updating routing information received and/or determined by the router 110. The example routing information storage 310 may be implemented by any number(s) and/or type(s) of volatile and/or non-volatile memory, storage, etc., or combination(s) thereof, such as the example volatile memory 1014 and/or the example mass storage device(s) 1028 included in the example of FIG. 10. The example router 110 uses the routing information stored in the routing information storage 310 in conjunction with any appropriate routing procedure to direct incoming traffic to the appropriate tunnel(s) and associated path(s) for routing the incoming traffic to a destination router.

The router 110 of the illustrated example also includes example network state information storage 315 to store network state information monitored by the router 110. For example, the state information stored in the network state information storage 315 can include, but is not limited to, traffic volume(s) for the tunnel(s) associated with the router 110 (e.g., for which the router 110 is an endpoint), the class(es) of traffic carried by the tunnel(s) associated with the router 110, link capacities for the link(s) (e.g., such as one or more of the links 110A-J) terminated at the router 110, etc. The example state information storage 315 may be implemented by any number(s) and/or type(s) of volatile and/or non-volatile memory, storage, etc., or combination(s) thereof, such as the example volatile memory 1014 and/or the example mass storage device(s) 1028 included in the example of FIG. 10.

The router 110 of the illustrated example further includes an example state information reporter 320 to report the network state information stored in the network state information storage 315 to a centralized rerouting controller, such as the example centralized rerouting controller 120 of FIG. 1, via the network interface 305. In some examples, the state information reporter 320 uses the network interface 305 to report the stored network state information to the example centralized rerouting controller 120 via one or more of the example communication links 125A-F. The example state information reporter 320 of FIG. 3 may report the state information to the centralized rerouting controller 120 at regular or irregular reporting intervals, based on the occurrence of one or more events (e.g., such as when a storage buffer is full, when a query is received from the centralized rerouting controller 120, etc.), etc., or any combination thereof.

The example router 110 of FIG. 3 includes an example fast reroute processor 325 to implement a Phase 1 FRR procedure at the router 110 to reroute tunnel traffic in response to a detected network failure/event, as described above. For example, the fast reroute processor 325 may implement any type of FRR procedure able to reroute tunnel traffic from an affected primary tunnel to a pre-computed backup tunnel. In some examples, the fast reroute processor 325 may be omitted from the example router 110.

The example router 110 of FIG. 3 also includes an example distributed rerouting processor 330 to implement a Phase 2 distributed rerouting procedure at the router 110, as described above. For example, the distributed rerouting processor 330 may implement any type of distributed rerouting procedure to reroute tunnel traffic from an affected primary tunnel to a backup tunnel using network state information (e.g., current link capacities, current traffic volumes, etc.) available locally at the router 110. In some examples, the distributed rerouting processor 330 may be omitted from the example router 110.

The example router 110 of FIG. 3 further includes an example centralized rerouting processor 335 to receive and process routing information received from a centralized rerouting controller, such as the centralized rerouting controller 120, implementing a Phase 3 centralized rerouting procedure. In some examples, the routing information received by the centralized rerouting processor 335 from the centralized rerouting controller is received via the network interface 305 in one or more routing update messages, such as one or more border gateway protocol—link state (BGP-LS) UPDATE messages, one or more OpenFlow messages, etc. In the illustrated example of FIG. 3, the centralized rerouting processor 335 uses the routing information received from the centralized rerouting controller to replace some or all of the routing information previously stored in the routing information storage 310, and/or updated by the fast reroute processor 325 and/or the distributed rerouting processor 330.

Figure 4:
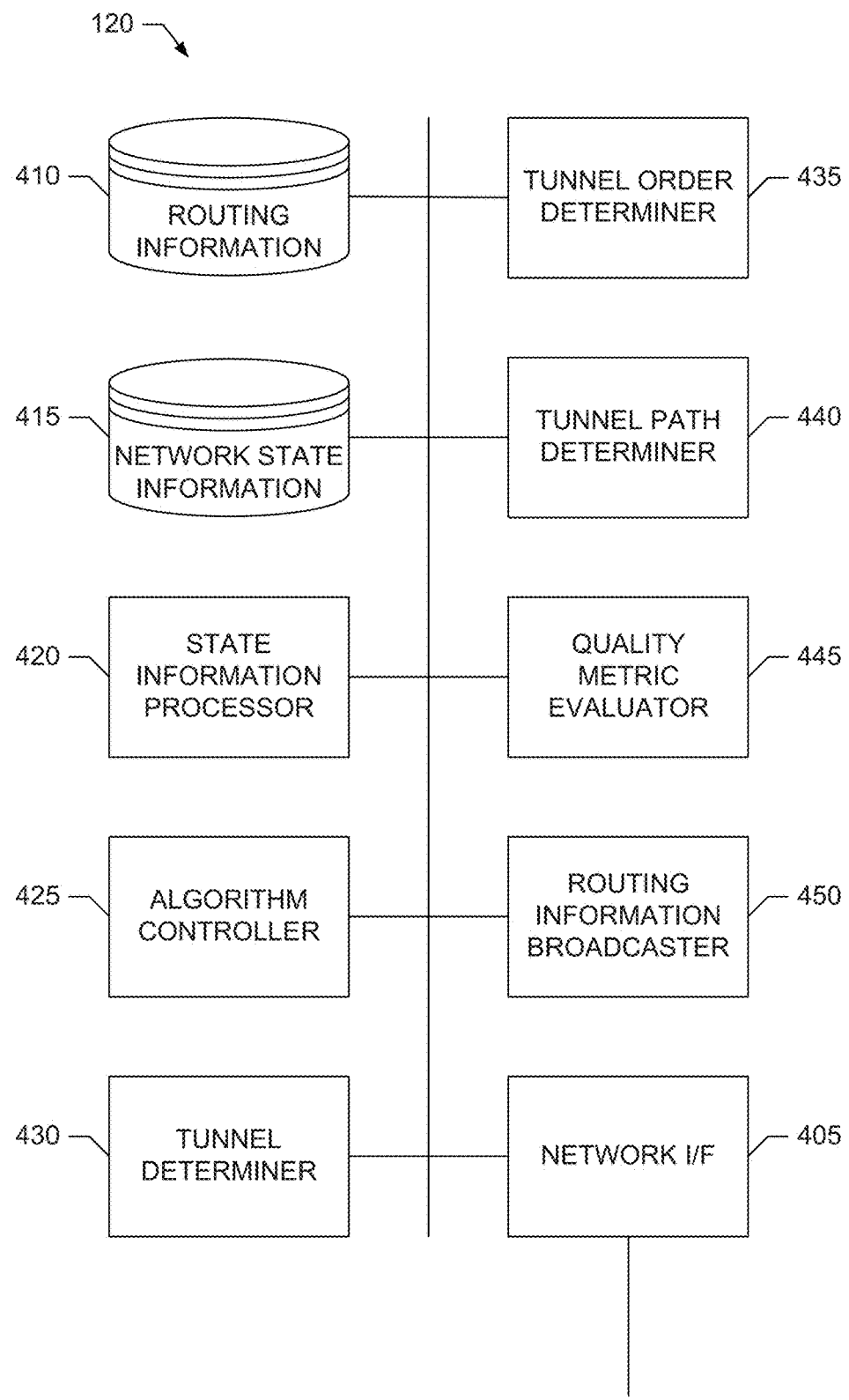
FIG. 4 is a block diagram of an example centralized rerouting controller included in the example system of FIG. 1 to perform tunnel traffic rerouting as disclosed herein.

A block diagram depicting an example implementation of the centralized rerouting controller 120 of FIG. 1 is illustrated in FIG. 4. The example centralized rerouting controller 120 of FIG. 4 includes an example network interface 405 to interface the centralized rerouting controller 120 with one or more communication links, such as one or more of the example links 125A-F of FIG. 1. The example network interface 405 can be implemented by any type(s), number(s) and/or combination(s) of network interfaces, such as the example interface circuit 1120 of FIG. 11, which is described in further detail below.

The example centralized rerouting controller 120 of FIG. 4 also includes example routing information storage 410 to, for example, store routing information describing a set of tunnel(s) and a corresponding set of path(s) implementing the tunnel(s) determined by the centralized rerouting controller 120 for rerouting tunnel traffic in the example network 105 in response to a detected network event. The example routing information storage 410 may be implemented by any number(s) and/or type(s) of volatile and/or non-volatile memory, storage, etc., or combination(s) thereof, such as the example volatile memory 1114 and/or the example mass storage device(s) 1128 included in the example of FIG. 11.

The example centralized rerouting controller 120 of FIG. 4 also includes example network state information storage 415 to store network state information reported by one or more of the routers 110A-F in the example network 105. For example, the state information stored in the network state information storage 415 can include, but is not limited to, traffic volume(s) for the tunnel(s) associated with the routers 110A-F (e.g., for which the routers 110A-F are endpoints), the class(es) of traffic carried by the tunnel(s) associated with the routers 110A-F, link capacities for the link(s) (e.g., such as the links 110A-J) terminated at the routers 110A-F, etc. The example state information storage 415 may be implemented by any number(s) and/or type(s) of volatile and/or non-volatile memory, storage, etc., or combination(s) thereof, such as the example volatile memory 1114 and/or the example mass storage device(s) 1128 included in the example of FIG. 11.

The example centralized rerouting controller 120 of FIG. 4 further includes an example state information processor 420 to receive network state information reported by the routers 110A-F and store the received network state information in the network state information storage 415. In some examples, the state information processor 420 uses the network interface 405 to receive the network state information from the example routers 110A-F via the example communication links 125A-F.

In the illustrated example of FIG. 4, the centralized rerouting controller 120 includes an example algorithm controller 425 to control an example centralized tunnel rerouting procedure implemented by the centralized rerouting controller 120. For example, the algorithm controller 425 initiates the centralized tunnel rerouting procedure in response to receiving, via the network interface 405, a report of a detected network event from one or more of the routers 110A-F in the example network 105. In some examples, the algorithm controller 425 initializes the centralized tunnel rerouting procedure with set of maximum tunnel sizes to be used to determine the set of tunnels for rerouting tunnel traffic in response to the detected network event. For example, a set of L different maximum tunnel sizes, denoted $M_l$, $l=1, \ldots, L$, may be configured by the algorithm controller 425 for the centralized tunnel rerouting procedure. The maximum tunnel size specifies the largest tunnel size to be considered by the centralized rerouting controller 120 when determining a tunnel between a pair of endpoint routers during a given iteration of the centralized tunnel rerouting procedure. In some examples, the maximum tunnel sizes, $M_l$, $l=1, \ldots, L$, are assumed to be monotonically decreasing in size.

In some examples, at the start of a given iteration of the centralized tunnel rerouting procedure, the algorithm controller 425 initializes the centralized tunnel rerouting procedure with the first value of the maximum tunnel size to be used. In some examples, the algorithm controller 425 also initializes a value of a best routing quality metric, $\kappa$, tracking the best interim routing solution to $\kappa=0$. The algorithm controller 425 then invokes other elements included in the example centralized rerouting controller 120 of FIG. 4 to implement the centralized tunnel rerouting procedure to determine the set of tunnels and corresponding set of paths implementing the tunnels to reroute the tunnel traffic in the network.

For example, the centralized rerouting controller 120 of FIG. 4 includes an example tunnel determiner 430 that is invoked by the algorithm controller 425 to determine, for a given maximum tunnel size, a set of target tunnels for rerouting the tunnel traffic in the network. For example, the tunnel determiner 430 processes the traffic volume and traffic class information stored in the network state information storage 415 and representing the current state of the network 105 to determine the amount of traffic (e.g., in terms of traffic bandwidth) to be exchanged between pairs of the routers 110A-F in the network 105 for different classes of service. Then, using the maximum tunnel size specified for the current processing iteration, the tunnel determiner 430 determines a set of target tunnels, denoted j=1, . . . , J, having respective tunnel sizes $t_j$ to be used to route the traffic between the different pairs of routers 110A-F for different classes of service.

For example, given a value of the maximum tunnel size, the tunnel determiner 430 determines the number of target tunnels to be established to carry the amount of traffic (e.g., the expected traffic bandwidth) between each pair of the routers 110A-F for each class of service. In some examples, for a given class of service and for a given origination-destination pair of the routers 110A-F, the tunnel determiner 430 may determine that one or several tunnels are to be established (e.g., depending on whether the amount of traffic for a given class of service exceeds the given value of the maximum tunnel size). If several tunnels are to be established to route traffic between a given router pair for a given class of service, in some examples the traffic for that router pair and class of service is split approximately equally among the different tunnels, whereas in other examples the traffic is split unequally among the different tunnels. In some examples, the smaller tunnels are able to be routed more easily in the network 105 than larger tunnels because more paths having sufficient capacity to carry the tunnel traffic for the smaller tunnels are available than for the larger tunnels.

After the tunnel determiner 430 determines the set of target tunnels, j=1, . . . , J, having respective tunnel sizes $t_j$ to be considered during the current processing iteration of the centralized tunnel rerouting procedure, the example algorithm controller 425 invokes an example tunnel order determiner 435 included in the example centralized rerouting controller 120 of FIG. 4. In the illustrated example, the tunnel order determiner 435 determines different orderings of the set of target tunnels, j=1, . . . , J, determined for a given maximum tunnel size, $M_l$. Then, for a given set of target tunnels, j=1, . . . , J, determined for a given maximum tunnel size, the algorithm controller 425 causes the centralized tunnel rerouting procedure to be performed for different ones of the tunnel orderings to determine different possible routing solutions having different sets of candidate paths for implementing the set of tunnels. For example, the tunnel order determiner 435 may determine N different orderings of the target tunnels, with the different orderings being indexed by n=1 to N.

In some examples, the tunnel order determiner 435 orders a given set of target tunnels, j=1, . . . , J, by placing the target tunnels for the highest class of service first, followed by the target tunnels for each lower class of service, in turn. Within a given class of service, there are various possible ways to order the target tunnels. For example, the target tunnels for a given class of service may be ordered by increasing or decreasing tunnel size, may be ordered by increasing or decreasing distance between the origin and destination router, may be ordered randomly, etc., or any combination thereof. Additionally or alternatively, other types of orderings may be included in the set of orderings for a given set of target tunnels. In some examples, the approach taken by the tunnel order determiner 435 to order the target tunnels for a given class of service includes (1) determining a first ordering the target tunnels by decreasing tunnel size, and the (2) determining subsequent orderings by choosing each target tunnel for the given class of service randomly, with the probability of choosing a particular target tunnel being proportional to the tunnel's size.

In the illustrated example of FIG. 4, after the tunnel determiner 430 determines the set of target tunnels, j= 1, . . . , J, having respective tunnel sizes $t_j$ to be considered during the current processing iteration of the centralized tunnel rerouting procedure, and after the tunnel order determiner 435 has determined the different possible orderings, n=1, . . . , N, for the current set of target tunnels, the example algorithm controller 425 invokes an example tunnel path determiner 440 included in the centralized rerouting controller 120 of FIG. 4. The example tunnel path determiner 440 determines a set of candidate paths for the set of target tunnels, j=1, . . . , J using a given ordering n from the set of N possible tunnel orderings. For example, for a given set of target tunnels, j=1, . . . , J and a given ordering n, the example algorithm controller 425 initializes the tunnel path determiner 440 with the available link capacities, $A_i$, for the links i=1, . . . , I, in the network 105. For example, example algorithm controller 425 initializes the available link capacities, $A_i$, for the links i=1, . . . , I, to be equal to the current existing capacities, $C_i$, of the links as determined from the state information stored in the network state information storage 415. In other words, the example algorithm controller 425 sets $A_i = C_i$ for the links i=1, . . . , I, in the network 105.

Then, for the current tunnel ordering, n, the tunnel path determiner 440 processes each target tunnel j=1, . . . , J with size $t_1$, in turn according to the current tunnel ordering n to determine a candidate path, $p_j$, for the target tunnel j. In some examples, the tunnel path determiner 440 determines the candidate path for the target tunnel j as follows. The tunnel path determiner 440 initially determines whether a candidate path $p_j$ capable of supporting the full tunnel size $t_j$ of the target tunnel j is available in the network 105. As such, the tunnel path determiner 440 initially considers only those links i having available capacity greater than the tunnel size, that is, with $A_i \geq t_j$. For example, the tunnel path determiner 440 may employ any appropriate shortest-path routing algorithm to determine whether a shortest-path capable of supporting the full tunnel size $t_j$ is available in the network 105. Examples of metrics that can be evaluated to determine whether a path is a shortest path include, but are not limited to: (1) a number of hops associated with the path, (2) an aggregate traffic latency or delay for the path determined by aggregating (e.g., accumulating) the individual latencies/delays of the links included in the path, (3) an aggregate cost for the path determined by aggregating (e.g., accumulating) the individual costs assigned to the links included in the path, etc., and/or any combination(s) thereof.

If such a candidate path $p_j$ capable of supporting the full tunnel size $t_j$ is available in the network 105, the tunnel path determiner 440 assigns the target tunnel j to this candidate path $p_j$. In some examples, if more than one path capable of supporting the full tunnel size $t_j$ is available in the network 105, the tunnel path determiner 440 selects one of the paths to be the candidate path $p_j$ for the target tunnel j using any appropriate selection technique (e.g., such as random selection, selection based on percentages of link capacity utilized by the different paths, latency, etc.).

In addition to assigning the target tunnel j to the determined candidate path $p_j$, for each link i included in the candidate path $p_j$, the tunnel path determiner 440 reduces the available capacity $A_i$ of the link i by the full tunnel size $t_j$ of the tunnel j. In other words, the tunnel path determiner 440 sets $A_i \leftarrow A_i \leftarrow t_j$ for each link i included in the candidate path $p_j$. Also, the tunnel path determiner 440 sets the value of a routed bandwidth metric, $r_j$, for the tunnel j (also referred to herein as a carried bandwidth metric) equal to the full tunnel size $t_j$ of the tunnel j. In other words, the tunnel path determiner 440 sets $r_j = t_j$ for the tunnel j. The tunnel path determiner 440 then stops processing tunnel j because a candidate path $p_j$ for this target tunnel has been determined.

However, if the tunnel path determiner 440 determines that a candidate path capable of supporting the full tunnel size $t_j$ of the tunnel j is not available in the network 105, in some examples the tunnel path determiner 440 determines whether a candidate path $p_j$ capable of supporting a portion (e.g., a fraction) of the full tunnel size $t_j$ is available in the network 105, such as a tunnel size of $t_j*F$ where $0<F<1$. For example, the tunnel path determiner 440 performs a routing algorithm, such as a shortest-path routing algorithm, to find a candidate path $p_j$ using only those links i having available capacity greater than the portion (fraction) of the tunnel size, that is, with $A_i \geq t_j*F$. If such a candidate path $p_j$ capable of supporting the portion (fraction) of the full tunnel size $t_j$ (e.g., $t_j*F$) is available in the network 105, the tunnel path determiner 440 assigns the target tunnel j to this candidate path $p_j$. In some examples, if more than one path capable of supporting the portion (fraction) of the full tunnel size $t_j$ (e.g., $t_j*F$) is available in the network 105, the tunnel path determiner 440 selects one of the paths to be the candidate path $p_j$ for the target tunnel j using any appropriate selection technique (e.g., such as random selection, selection based on percentages of link capacity utilized by the different paths, etc.).

In addition to assigning the target tunnel j to the determined candidate path $p_j$, for each link i included in the candidate path $p_j$, the tunnel path determiner 440 reduces the available capacity $A_i$ of the link i by the portion (fraction) of the full tunnel size $t_j$ (e.g., $t_j*F$) of the tunnel j. In other words, the tunnel path determiner 440 sets $A_i \leftarrow A_i \leftarrow t_j*F$ for each link i included in the candidate path $p_j$. Also, the tunnel path determiner 440 sets the value of the routed bandwidth metric, $r_j$, for the tunnel j equal to the portion (fraction) of the full tunnel size $t_j$ (e.g., $t_j*F$) of the tunnel j. In other words, the tunnel path determiner 440 sets $r_j = t_j*F$ for the tunnel j. The tunnel path determiner 440 then stops processing tunnel j because a candidate path $p_j$ for this tunnel has been determined.

However, if the tunnel path determiner 440 determines that a candidate path capable of supporting the portion (fraction) of the full tunnel size $t_j$ (e.g., $t_j*F$) of the tunnel j is not available in the network 105, the tunnel path determiner 440 may iteratively attempt to determine a candidate path $p_j$ capable of supporting an even smaller portion (fraction) of the full tunnel size $t_j$. However, in some examples, if after a number of processing iterations a candidate path is still not found by the tunnel path determiner 440, the tunnel path determiner 440 indicates that no path is available for the target tunnel j, and sets the value of the routed bandwidth metric, $r_j$, for the tunnel j equal to the zero (e.g., $r_j=0$).

After the tunnel path determiner 440 determines a respective set of candidate paths $p_j$ for the set of target tunnels, $j=1, \ldots, J$, being considered for the current maximum tunnel size, $M_l$ the example algorithm controller 425 invokes an example quality metric evaluator 445 included in the example centralized rerouting controller 120 of FIG. 4. The example quality metric evaluator 445 determines a value of quality metric for the set of target tunnels, $j=1, \ldots, J$. In some examples, the quality metric corresponds to a routing quality metric characterizing an aggregate tunnel bandwidth supported (e.g., carried) by the set of candidate paths $p_j$ determined for the current set of target tunnels, $j=1, \ldots, J$. In some such examples, the quality metric evaluator 445 determines the value, q, of the quality metric for the set of target tunnels, $j=1, \ldots, J$ to be the sum of the routed bandwidth metrics, $r_j$, for each of the target tunnels in the set of target tunnels, $j=1, \ldots, J$. In other words, in such examples, the quality metric evaluator 445 determines the value, q, of the quality metric for the current set of target tunnels, $j=1, \ldots, J$ to be $q=\Sigma_j r_j$.

In the illustrated example, the quality metric evaluator 445 also determines if the quality metric value $q=\Sigma_j r_j$ for the current set of target tunnels, $j=1, \ldots, J$ exceeds the quality metric value, $\kappa$, (which is initialized to be equal to zero at the start of processing, as described above) corresponding to the best interim routing solution determined by the centralized rerouting controller 120 so far. If the quality metric value $q=\Sigma_j r_j$ for the current set of target tunnels, $j=1, \ldots, J$ currently being evaluated exceeds the quality metric value, $\kappa$, for the best interim routing solution (that is, if $\kappa > q=\Sigma_j r_j$), then the quality metric evaluator 445 updates the best interim routing solution to now correspond to the current set of target tunnels, $j=1, \ldots, J$ and the respective set of candidate paths $p_j$ implementing those tunnels. The quality metric evaluator 445 further sets the quality metric value, $\kappa$, for the best interim routing solution equal to the quality metric value $q=\Sigma_j r_j$ for the current set of target tunnels, that is, $\kappa = q = \Sigma_j r_j$.

In some examples, if the quality metric value $q=\Sigma_j r_j$ for the current set of target tunnels, $j=1, \ldots, J$ being evaluated equals the sum of the full tunnel sizes $t_j$ of the respective target tunnels (that is, if $q=\Sigma_j r_j = \Sigma_j \Sigma_j$), then the quality metric evaluator 445 sets the set of tunnels and corresponding set of paths of the current final routing solution to be the current set of target tunnels, $j=1, \ldots, J$ and the respective set of candidate paths $p_j$ implementing those tunnels. This is because all of the tunnel traffic is able to be routed within the set of target tunnels implemented by the set of candidate paths determined during the current processing iteration. The example algorithm controller 425 then causes the centralized tunnel rerouting procedure to terminate if the quality metric evaluator 445 determines that a final solution has been achieved (e.g., if $\kappa=\Sigma_j t_j$).

However, if a final solution has not been achieved (e.g., if $\kappa < \Sigma_j t_j$), then the example algorithm controller 425 invokes the example tunnel path determiner 440 again to determine a set of candidate paths for the set of target tunnels using a different tunnel ordering, n. After all possible tunnel orderings for a given set of target tunnels have been processed by the tunnel path determiner 440, the example algorithm controller 425 then invokes the example tunnel determiner 430 and the example tunnel order determiner 435 to determine a new set of target tunnels and new set of tunnel orderings for a next maximum tunnel size $M_l$ in the set of maximum tunnel sizes. After the different sets of target tunnels for the different maximum tunnel sizes have been processed, the algorithm controller 425 invokes the quality metric evaluator 445 to determine the set of tunnels and corresponding set of paths of the final routing solution to be the set of target tunnels and corresponding set of candidate paths having the best (e.g., largest) value of the quality metric.

In the illustrated example of FIG. 4, the centralized rerouting controller 120 includes an example routing information broadcaster 450 to broadcast or otherwise send routing information describing the set of tunnels and the set of paths included in the final solution to the routers 110A-F in the network 105. For example, the routing information broadcaster 450 may send routing update messages, such as BGP-LS UPDATE messages, OpenFlow messages, etc., containing routing information describing the set of tunnels and the set of paths included in the final solution to the routers 110A-F using the network interface 405 and the links 125A-F. As noted above, the routing information sent by the routing information broadcaster 450 to the routers 110A-F may replace previous routing information already stored at the routers 110A-F (e.g., as determined by the Phase 1 and/or Phase 2 rerouting procedures described above in response to the network event that also triggered rerouting processing in the centralized rerouting controller 120), thereby causing the routers 110A-F to route traffic using the set of tunnels and corresponding set of paths described in the routing information sent by the routing information broadcaster 450.

While example manners of implementing the example system 100 are illustrated in FIGS. 1-4, one or more of the elements, processes and/or devices illustrated in FIGS. 1-4 may be combined, divided, re-arranged, omitted, eliminated and/or implemented in any other way. Further, the example network 105, the example routers 110A-F, the example communication links 115A-J, the centralized rerouting controller 120, the example communication links 125A-F, the example network interface 305, the example routing information storage 310, the example network state information storage 315, the example state information reporter 320, the example fast reroute processor 325, the example distributed rerouting processor 330, the example centralized rerouting processor 335, the example network interface 405, the example routing information storage 410, the example network state information storage 415, the example state information processor 420, the example algorithm controller 425, the example tunnel determiner 430, the example tunnel order determiner 435, the example tunnel path determiner 440, the example quality metric evaluator 445, the example routing information broadcaster 450 and/or, more generally, the example system 100 of FIGS. 1-4 may be implemented by hardware, software, firmware and/or any combination of hardware, software and/or firmware. Thus, for example, any of the example network 105, the example routers 110A-F, the example communication links 115A-J, the centralized rerouting controller 120, the example communication links 125A-F, the example network interface 305, the example routing information storage 310, the example network state information storage 315, the example state information reporter 320, the example fast reroute processor 325, the example distributed rerouting processor 330, the example centralized rerouting processor 335, the example network interface 405, the example routing information storage 410, the example network state information storage 415, the example state information processor 420, the example algorithm controller 425, the example tunnel determiner 430, the example tunnel order determiner 435, the example tunnel path determiner 440, the example quality metric evaluator 445, the example routing information broadcaster 450 and/ or, more generally, the example system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example system 100, the example network 105, the example routers 110A-F, the example communication links 115A-J, the centralized rerouting controller 120, the example communication links 125A-F, the example network interface 305, the example routing information storage 310, the example network state information storage 315, the example state information reporter 320, the example fast reroute processor 325, the example distributed rerouting processor 330, the example centralized rerouting processor 335, the example network interface 405, the example routing information storage 410, the example network state information storage 415, the example state information processor 420, the example algorithm controller 425, the example tunnel determiner 430, the example tunnel order determiner 435, the example tunnel path determiner 440, the example quality metric evaluator 445 and/or the example routing information broadcaster 450 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 100 of FIGS. 1-4 may include one or more elements, processes and/or devices in addition to, or instead of, those illustrated in FIGS. 1-4, and/or may include more than one of any or all of the illustrated elements, processes and devices.

Flowcharts representative of example machine readable instructions for implementing the example system 100, the example network 105, the example routers 110A-F, the example communication links 115A-J, the centralized rerouting controller 120, the example communication links 125A-F, the example network interface 305, the example routing information storage 310, the example network state information storage 315, the example state information reporter 320, the example fast reroute processor 325, the example distributed rerouting processor 330, the example centralized rerouting processor 335, the example network interface 405, the example routing information storage 410, the example network state information storage 415, the example state information processor 420, the example algorithm controller 425, the example tunnel determiner 430, the example tunnel order determiner 435, the example tunnel path determiner 440, the example quality metric evaluator 445 and/or the example routing information broadcaster 450 are shown in FIGS. 5-9. In these examples, the machine readable instructions comprise one or more programs for execution by a processor, such as the processor 1012 and/or the processor 1112 shown in the examples of FIGS. 10 and 11, respectively. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processors 1012 and/or 1112, but the entire program or programs and/or portions thereof could alternatively be executed by a device other than the processors 1012 and/or 1112, and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 5-9, many other methods of implementing the example system 100, the example network 105, the example routers 110A-F, the example communication links 115A-J, the centralized rerouting controller 120, the example communication links 125A-F, the example network interface 305, the example routing information storage 310, the example network state information storage 315, the example state information reporter 320, the example fast reroute processor 325, the example distributed rerouting processor 330, the example centralized rerouting processor 335, the example network interface 405, the example routing information storage 410, the example network state information storage 415, the example state information processor 420, the example algorithm controller 425, the example tunnel determiner 430, the example tunnel order determiner 435, the example tunnel path determiner 440, the example quality metric evaluator 445 and/or the example routing information broadcaster 450 may alternatively be used. For example, with reference to the flowcharts illustrated in FIGS. 5-9, the order of execution of the blocks may be changed, and/or some of the blocks described may be changed, eliminated, combined and/or subdivided into multiple blocks.

As mentioned above, the example processes of FIGS. 5-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-9 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Also, as used herein, the terms "computer readable" and "machine readable" are considered equivalent unless indicated otherwise.

Figure 5:
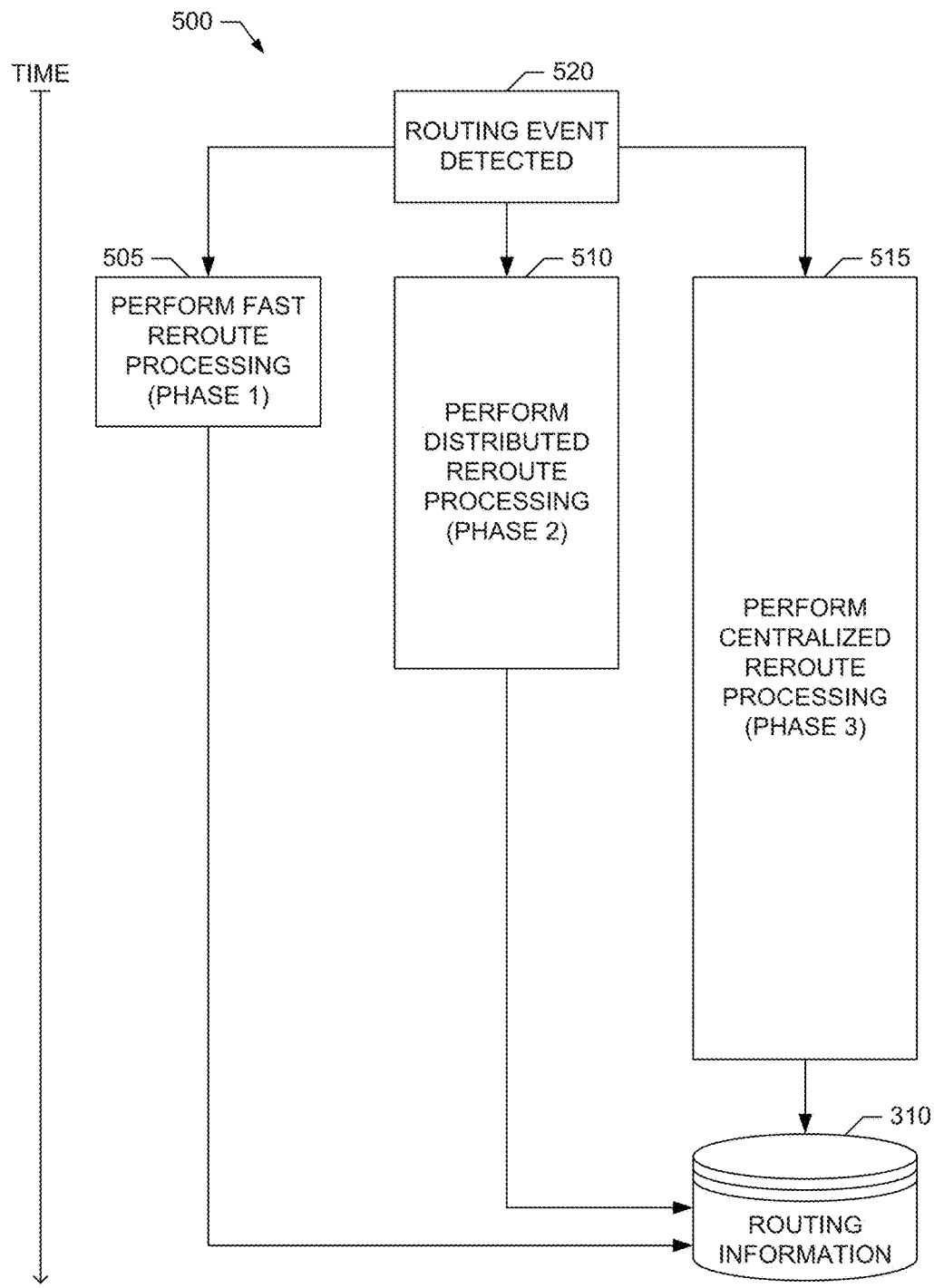
FIG. 5 is a flowchart representative of an example tunnel traffic rerouting procedure supported by the example system of FIG. 1.

An example process 500 that may be executed by the example system 100 to perform tunnel traffic rerouting in the example network 105 of FIG. 1 is illustrated in FIG. 5. The example process 500 implements an example multi-phase tunnel traffic rerouting procedure in accordance with the teachings disclosed above. For convenience and without loss of generality, execution of the example process 500 is described in the context of the example router 110 operating in the example network 105 of FIG. 1, and with reference to the preceding figures and associated written descriptions.

In the illustrated example of FIG. 5, the process 500 implements a three-phase tunnel traffic rerouting procedure, which includes an example FRR procedure 505 implementing Phase 1 of the procedure, an example distributed rerouting procedure 510 implementing Phase 2 of the procedure, and an example centralized rerouting procedure 515 implementing Phase 3 of the procedure. As shown in the example of FIG. 1, the FRR procedure 505 (Phase 1) is completed in the shortest amount of time, followed by the distributed rerouting procedure 510 (Phase 2), and with the centralized rerouting procedure 515 (Phase 3) taking the most amount of time to complete. Accordingly, in response to a network event (e.g., a failure event or other event affecting the routing of traffic in the network 105) being detected (block 520), the example process 500 invokes the three phases of the multiphase rerouting procedure substantially in parallel.

For example, in response to a network event being detected (block 520), the router 110 invokes its fast reroute processor 325 to perform the FRR procedure 505 (Phase 1), as described above. Additionally, in response to the network event being detected (block 520), the router 110 also invokes its distributed rerouting processor 330 to perform the distributed rerouting procedure 510 (Phase 2), as described above. In the illustrated example of FIG. 5, the FRR procedure 505 (Phase 1) performed by the fast reroute processor 325 completes first and, thus, yields first updated routing information to be stored in the example routing information storage 310 of the router 110 for use in subsequent traffic routing operations. Sometime thereafter, the distributed rerouting procedure 510 (Phase 2) performed by the distributed rerouting processor 330 completes and, thus, yields second updated routing information to be stored in the example routing information storage 310 of the router 110 for use in subsequent traffic routing operations. In some examples, the second routing information is an improvement over the first routing information because the second routing information accounts for network state information available locally at the router 110.

In parallel with the FRR procedure 505 (Phase 1) and the distributed rerouting procedure 510 (Phase 2) being performed at the router 110, and in response to the network failure being detected (block 520), the example centralized rerouting controller 120 performs the centralized rerouting procedure 515 (Phase 3), as described above. When the centralized rerouting procedure 515 (Phase 3) completes, the centralized rerouting controller 120 reports third routing information to the router 110, which is stored in the example routing information storage 310 of the router 110 for use in subsequent traffic routing operations. In some examples, the third routing information replaces some or all of the first routing information and/or second routing information determined by the Phase 1 and Phase 2 procedures in response to the detected network event. In some examples, the third routing information is an improvement over the first and second routing information because the third routing information accounts for the global state of the network 105.

Figure 6:
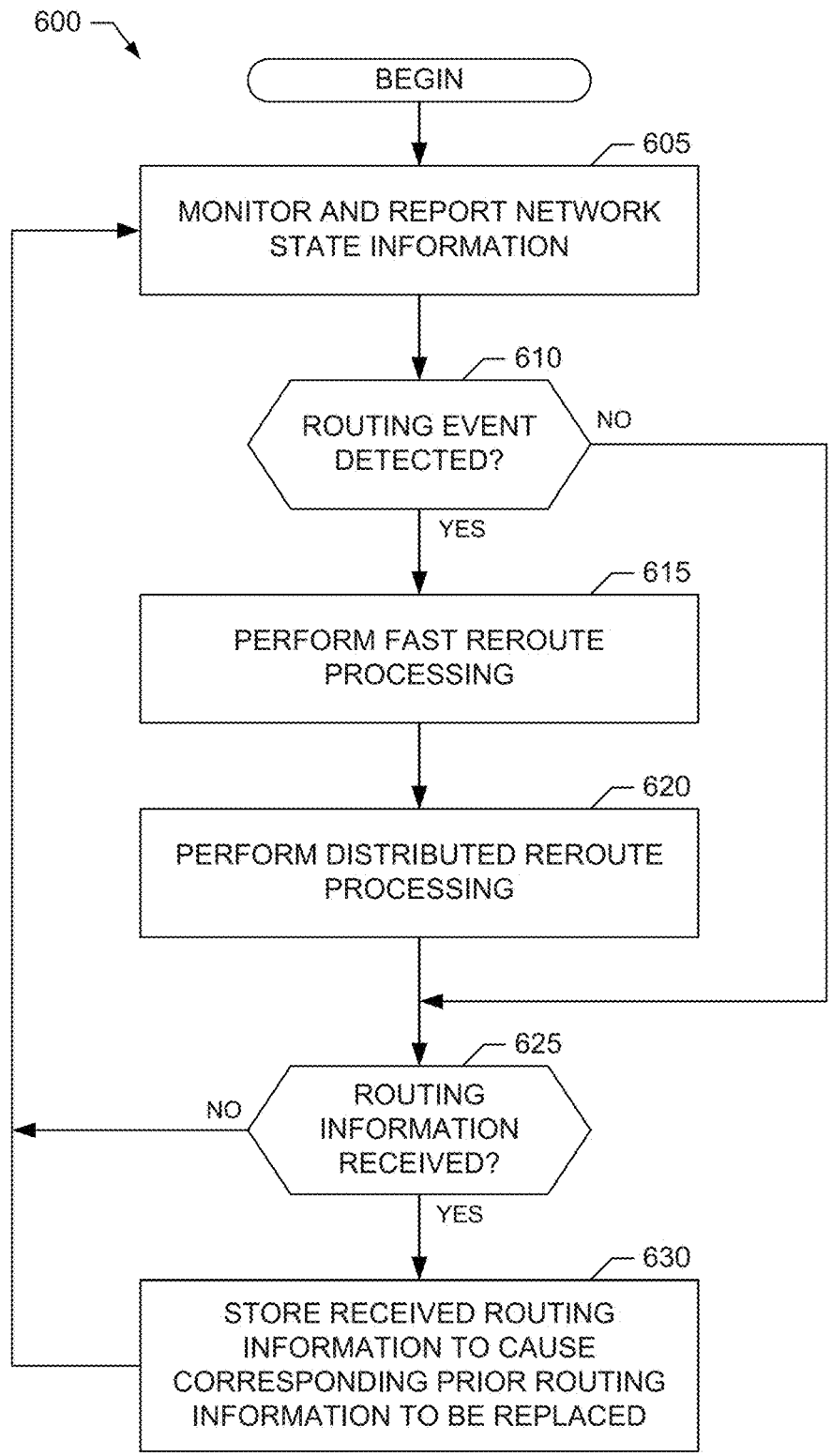
FIG. 6 is a flowchart representative of example machine readable instructions that may be executed by the example router of FIG. 3 to implement the example tunnel traffic rerouting procedure illustrated in FIG. 5.

An example program 600 including example machine readable instructions that may be executed to implement one or more of the example routers 110 and/or 110A-F, and to thereby perform at least some of the example process 500, is represented by the flowchart shown in FIG. 6. For convenience and without loss of generality, execution of the example program 600 is described in the context of the example router 110 operating in the example network 105 of FIG. 1. With reference to the preceding figures and associated written descriptions, the example program 600 of FIG. 6 begins execution at block 605 at which the example state information reporter 320 of the router 110 monitors and reports network state information to the example centralized rerouting controller 120, as described above. If the router 110 detects a network event (block 610), then processing proceeds to blocks 615 and 620. At block 615, the example fast reroute processor 325 of the router 110 performs an FRR procedure, as described above, to determine routing information to reroute tunnel traffic from an affected primary tunnel to a pre-computed backup tunnel. At block 620, the example distributed rerouting processor 330 of the router 110 performs a distributed rerouting procedure, as described above, to determine routing information to reroute tunnel traffic from an affected primary tunnel to another tunnel based on network state information available locally at the router 110.

At block 625, the router 110 determines whether routing information has been received from the centralized rerouting controller 120 via the example network interface 305 of the router 110. If routing information has been received from the centralized rerouting controller 120 (block 625), then at block 630 the example centralized rerouting processor 335 of the router 110 stores the received routing information in the example routing information storage 310 (thereby replacing some or all of the routing information determined at blocks 615 and/or 620, in some examples) for use in subsequent routing procedures performed by the router 110. Processing then returns to block 605 and blocks subsequent thereto at which the router 110 continues to report network state information and monitor for network events.

Figure 7:
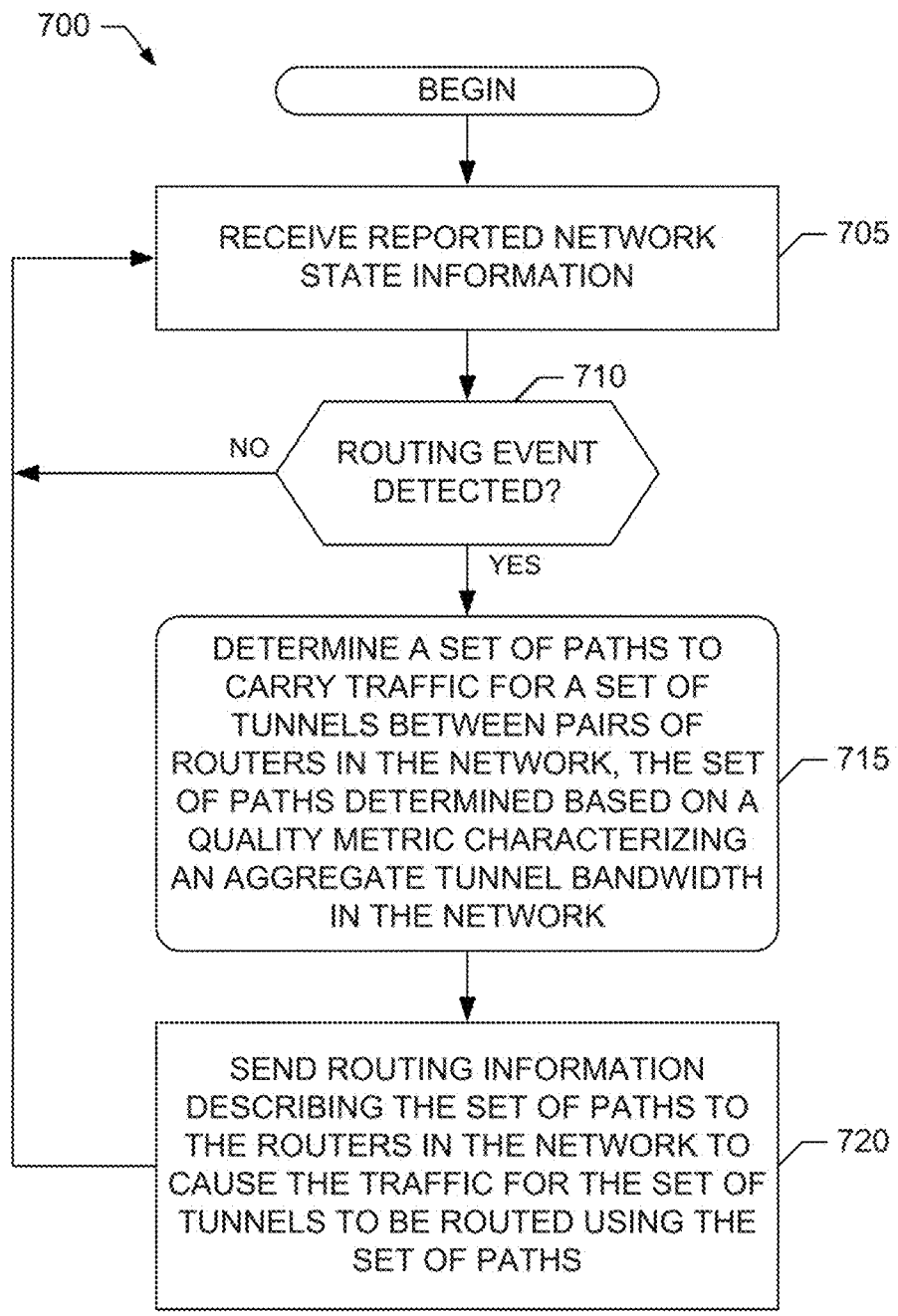
FIG. 7 is a flowchart representative of example machine readable instructions that may be executed by the example centralized rerouting controller of FIG. 4 to implement the example tunnel traffic rerouting procedure illustrated in FIG. 5.

An example program 700 including example machine readable instructions that may be executed to implement the example centralized rerouting controller 120 of FIGS. 1 and/or 4, and to thereby perform at least some of the example process 500, is represented by the flowchart shown in FIG. 7. For convenience and without loss of generality, execution of the example program 700 is described in the context of the example centralized rerouting controller 120 of FIG. 4 operating in the example network 105 of FIG. 1. With reference to the preceding figures and associated written descriptions, the example program 700 of FIG. 7 begins execution at block 705 at which the example state information processor 420 of the centralized rerouting controller 120 receives network state information reported by one or more of the routers 110A-F in the network 105. At block 710, the example algorithm controller 425 of the centralized rerouting controller 120 determines whether information reporting a network event (e.g., failure or other routing-related event) has been received from one or more of the routers 110A-F. If information reporting a network event has been received, processing proceeds to block 715 at which the centralized rerouting controller 120 determines, as described above, a final routing solution for rerouting tunnel traffic in the network 105. For example, and as described above, the final routing solution includes a set of tunnels and a corresponding set of paths to carry the traffic for the tunnels, with the set of paths (and, in some examples, the set of tunnels, such as when more than one maximum tunnel size is used during the rerouting procedure) being determined based on a quality metric characterizing an aggregate tunnel bandwidth in the network 105. An example program to perform the processing at block 715 is illustrated in FIGS. 8A-8B, which are described in further detail below.

At block 720, the example routing information broadcaster 450 of the centralized rerouting controller 120 broadcasts or otherwise sends routing information describing the set of tunnels and the set of paths included in the final solution to the routers 110A-F in the network 105, as described above, which may replace at least some of the routing information already stored at one or more of the routers 110A-F. Processing then returns to block 705 and blocks subsequent thereto at which the centralized rerouting controller 120 continues to receive network state information and monitor for network failures/events.

Figure 8A:
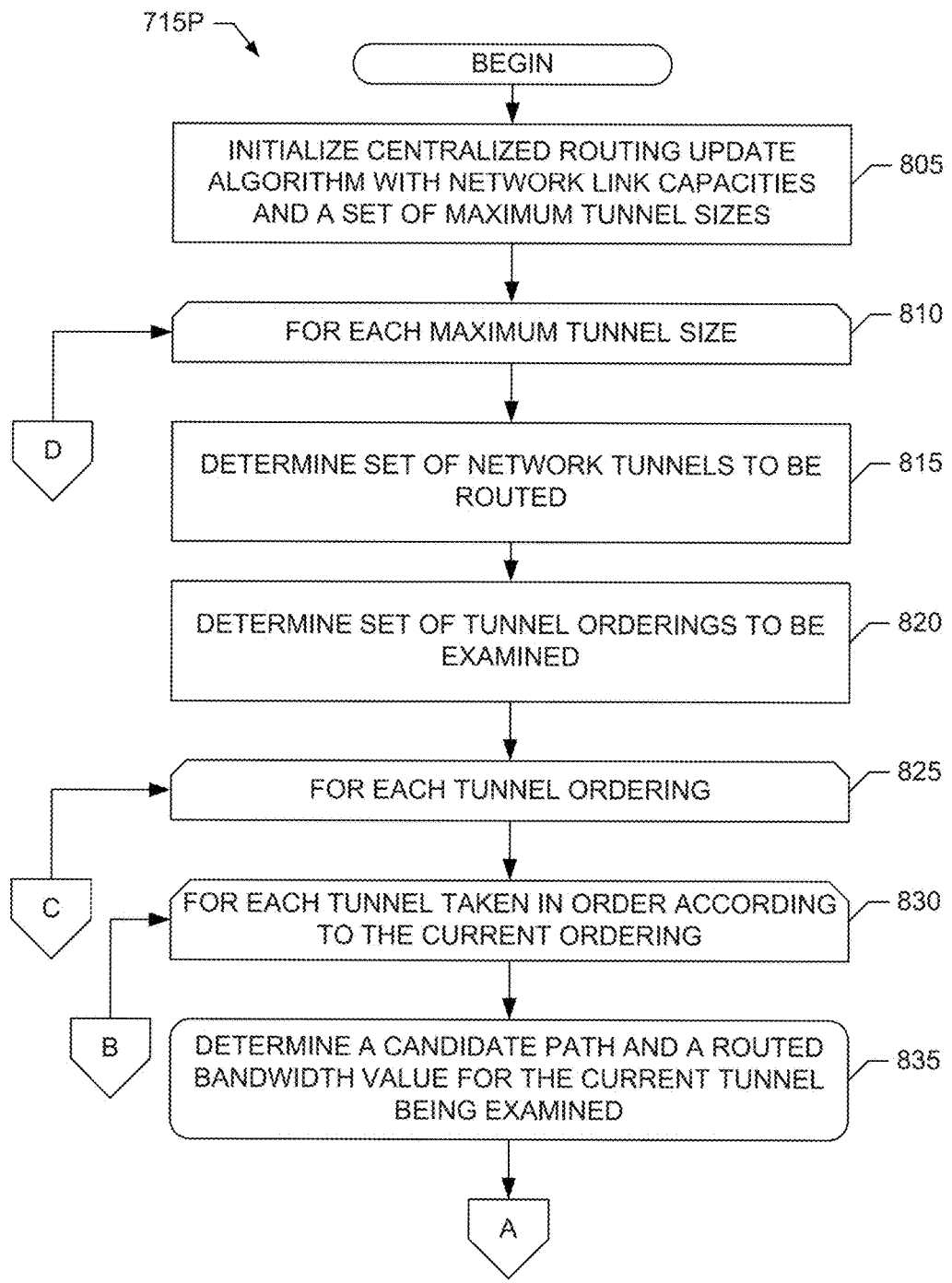
FIGS. 8A-8B collectively from a flowchart representative of example machine readable instructions that may be executed by the example centralized rerouting controller of FIG. 4 to determine a set of paths to route traffic for a set of tunnels to implement the example tunnel traffic rerouting procedure illustrated in FIG. 5.
Figure 8B:
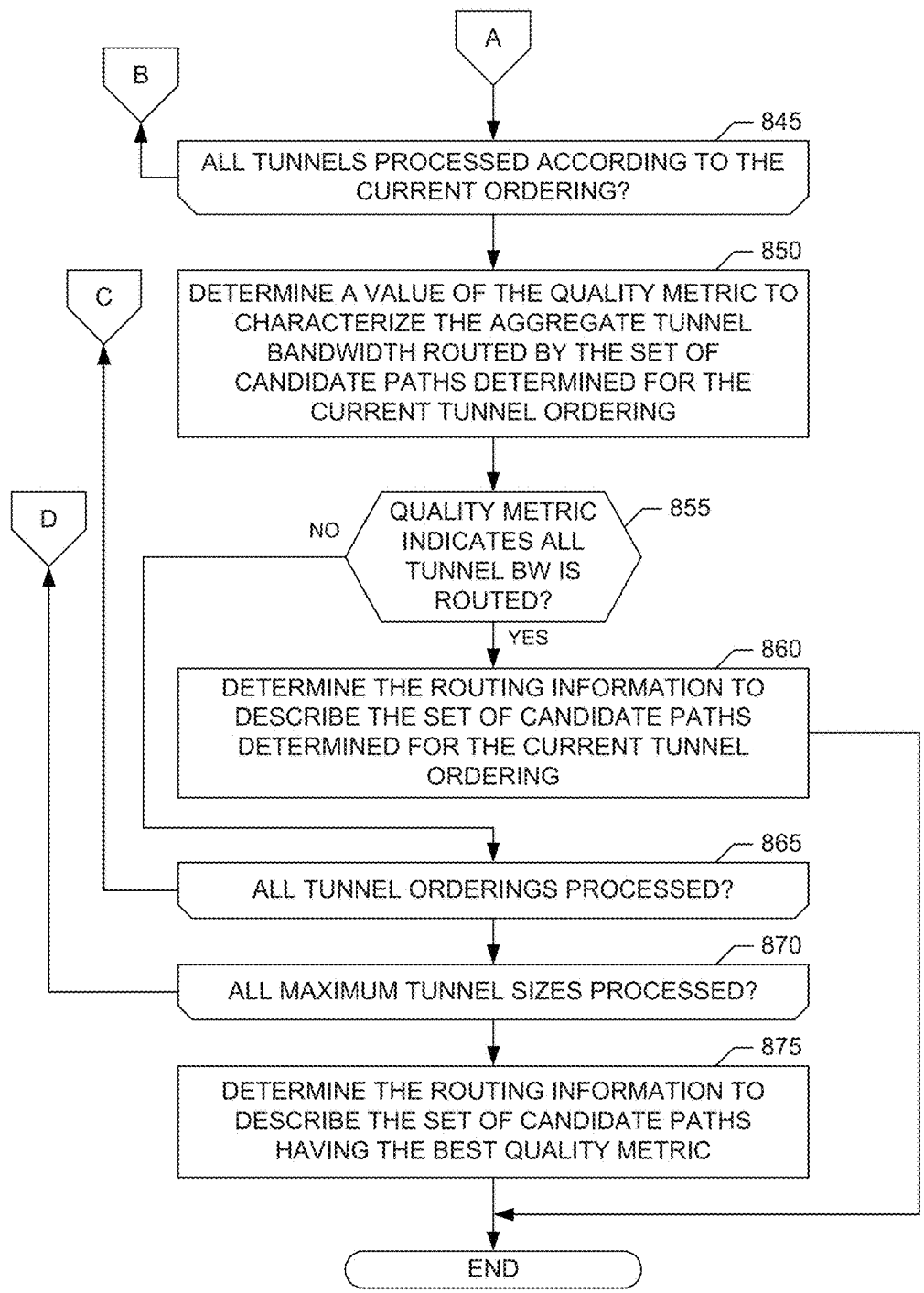

An example program 715P including example machine readable instructions that may be executed to implement the example centralized rerouting controller 120 of FIGS. 1 and/or 4, and/or to perform the processing at block 715 of FIG. 7, is represented by the flowchart shown in FIGS. 8A-8B. For convenience and without loss of generality, execution of the example program 715P is described in the context of the example centralized rerouting controller 120 of FIG. 4 operating in the example network 105 of FIG. 1. With reference to the preceding figures and associated written descriptions, the example program 715P begins execution at block 805 of FIG. 8A at which the example algorithm controller 425 of the example centralized rerouting controller 120 responds to a report of a detected network event (e.g., a failure event or other routing-related event) by initializing, as described above, the centralized rerouting controller 120 with the link capacities for the links 115A-J in the network 105 (e.g., as determined from the state information stored in the example network state information storage 415) and a set of maximum tunnel sizes, $M_l$, to be considered. At block 810, the algorithm controller 425 performs an outer processing loop in which different values of the maximum tunnel size, $M_l$, are used in different processing iterations.

For example, for a given value of the maximum tunnel size, $M_l$, processing proceeds to block 815 at which the example tunnel determiner 430 of the centralized rerouting controller 120 determines, as described above, a set of target tunnels, j=1, . . . , J, to be routed in the network 105. At block 820, the example tunnel order determiner 435 of the centralized rerouting controller 120 determines, as described above, a set of n=1 to N different orderings of the current set of target tunnels to be evaluated. At block 825, the algorithm controller 425 performs an inner processing loop in which different orderings, n, of the current set of target tunnels are used in different processing iterations.

For example, at block 830, the algorithm controller 425 causes each target tunnel, j, in the current set of target tunnels to be routed in turn according to the particular ordering n being used for that processing iteration. At block 835, the example tunnel path determiner 440 in the centralized rerouting controller 120 determines, as described above, a candidate paths $p_j$ through the network 105 to carry the traffic for the current target tunnel, j, being routed. At block 835, the tunnel path determiner 440 also determines, as described above, a routed bandwidth value for the current target tunnel, j, being routed (e.g., which may be equal to or less than the full tunnel size $t_j$ of the current target tunnel, j). An example program to perform the processing at block 835 is illustrated in FIG. 9, which is described in further detail below.

At block 845 of FIG. 8B, the algorithm controller 425 continues routing each tunnel j in the current set of target tunnels according to the current tunnel ordering n. After the tunnels j in the current set of target tunnels have been routed, at block 850 the example quality metric evaluator 445 of the centralized rerouting controller 120 determines, as described above, a value, q, of a quality metric for the current set of target tunnels, which characterizes the aggregate tunnel bandwidth routed by the set of candidate paths $p_j$ determined for the current set of target tunnels. At block 855, the quality metric evaluator 445 determines whether the quality metric value q for the current set of target tunnels indicates that the current routing solution supports all of the tunnel bandwidth, that is, whether the full tunnel sizes $t_j$ for all tunnels in the current set of target tunnels are supported by the set of candidate paths $p_j$ (e.g., whether $q=\Sigma_j t_j$). If the current routing solution supports all of the tunnel bandwidth (e.g., if $q=\Sigma_j t_j$ at block 855), then at block 860 the quality metric evaluator 445 determines the routing information corresponding to the final routing solution to include the current set of target tunnels and the corresponding set of candidate paths implementing the target tunnels, as described above. Execution of the example program 715P then ends.

However, if the current routing solution does not support all of the tunnel bandwidth (e.g., if $q<\Sigma_j t_j$ at block 855), then at block 865 the algorithm controller 425 continues performing the inner processing loop to permit processing of the different tunnel ordering for the current set of target tunnels. At block 870, the algorithm controller 425 continues performing the outer processing loop to permit processing of the different sets of target tunnels determines for different values of the maximum tunnel size, $M_l$. At block 875, the quality metric evaluator 445 determines the routing information corresponding to the final routing solution to include the set of target tunnels and the corresponding set of candidate paths having the best (e.g., largest) quality metric, q, as described above. Execution of the example program 715P then ends.

Figure 9:
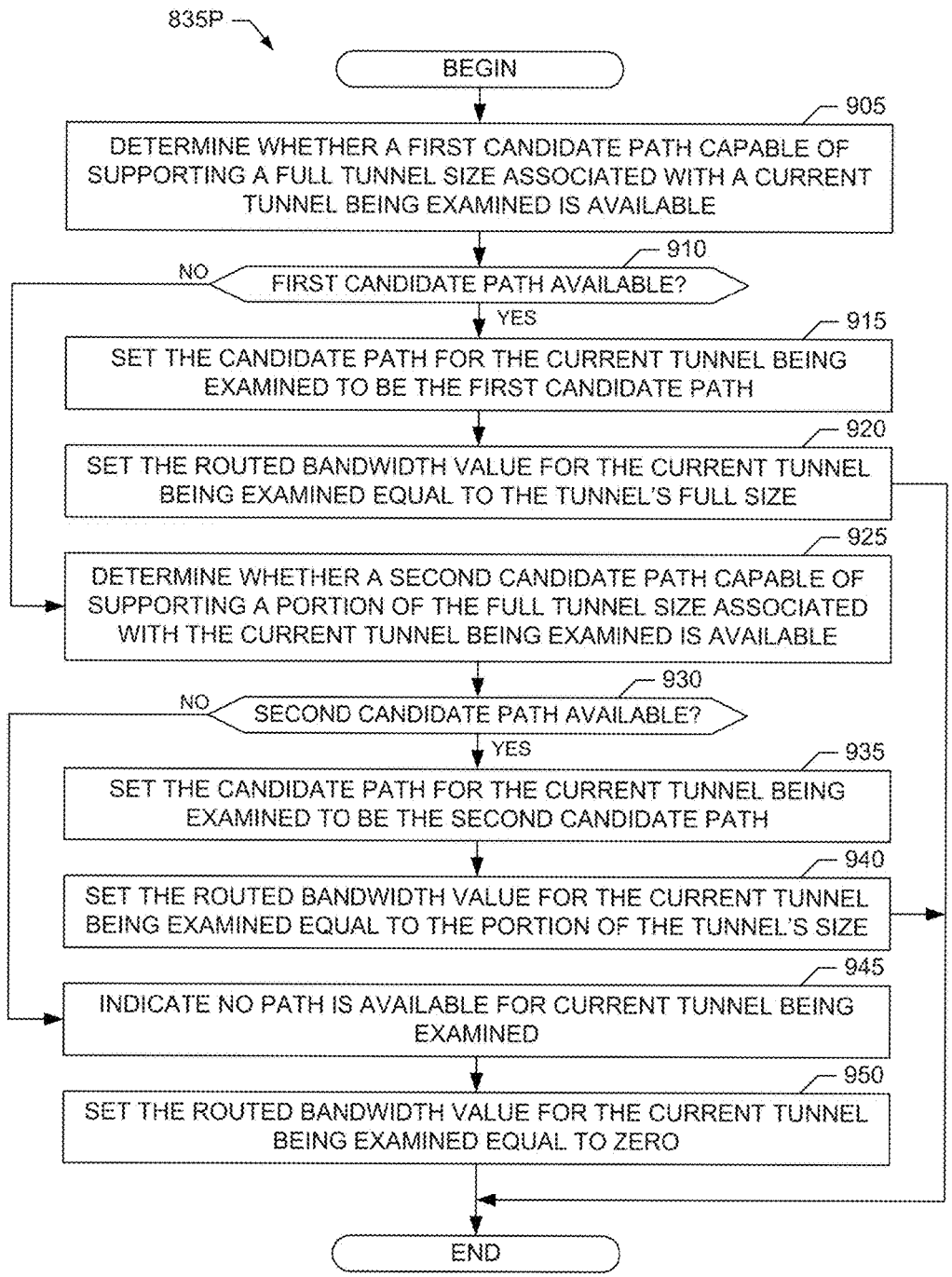
FIG. 9 is a flowchart representative of example machine readable instructions that may be executed by the example centralized rerouting controller of FIG. 4 to determine a candidate path for a tunnel to implement the example tunnel traffic rerouting procedure illustrated in FIG. 5.

An example program 835P including example machine readable instructions that may be executed to implement the example tunnel path determiner 440 of the example centralized rerouting controller 120 of FIGS. 1 and/or 4, and/or to perform the processing at block 835 of FIG. 8, is represented by the flowchart shown in FIG. 9. For convenience and without loss of generality, execution of the example program 835P is described in the context of the example centralized rerouting controller 120 of FIG. 4 operating in the example network 105 of FIG. 1. With reference to the preceding figures and associated written descriptions, the example program 835P of FIG. 9 begins execution at block 905 at which the tunnel path determiner 440 determines, using any appropriate routing procedure, such as a shortest path routing procedure as described above, whether a first candidate path $p_j$ capable of supporting the full tunnel size $t_j$ of a current tunnel j being routed is available in the example network 105. If the first candidate path is available (block 910), at block 915 the tunnel path determiner 440 sets the candidate path for this tunnel to be the first candidate path $p_j$ to thereby assign the current tunnel j to this first candidate path $p_j$, as described above. At block 920, the tunnel path determiner 440 sets the value of the routed bandwidth metric, $r_j$, for the current tunnel j equal to the full tunnel size $t_j$ of the tunnel j, as described above. Execution of the example program 835P then ends.

However, if the first candidate path is not available (block 910), at block 930 the tunnel path determiner 440 determines, using any appropriate routing algorithm, such as a shortest path routing algorithm as described above, whether a second candidate path $p_j$ capable of supporting a portion (e.g., fraction) of the full tunnel size $t_j$ of a current tunnel j being routed is available in the example network 105. If a second candidate path is available (block 930), at block 935 the tunnel path determiner 440 sets the candidate path for this tunnel to be the second candidate path $p_j$ to thereby assign the current tunnel j to this second candidate path $p_j$, as described above. At block 940, the tunnel path determiner 440 sets the value of the routed bandwidth metric, $r_j$, for the current tunnel j equal to the portion (e.g., fraction) of the full tunnel size $t_j$ of the tunnel j, as described above. Execution of the example program 835P then ends.

However, if a second candidate path is not available (block 930), then at block 945 of the illustrated example the tunnel path determiner 440 indicates that no candidate path is available for the current tunnel j. At block 950, the tunnel path determiner 440 sets the value of the routed bandwidth metric, $r_j$, for the current tunnel j equal to zero. Execution of the example program 835P then ends.

Figure 10:
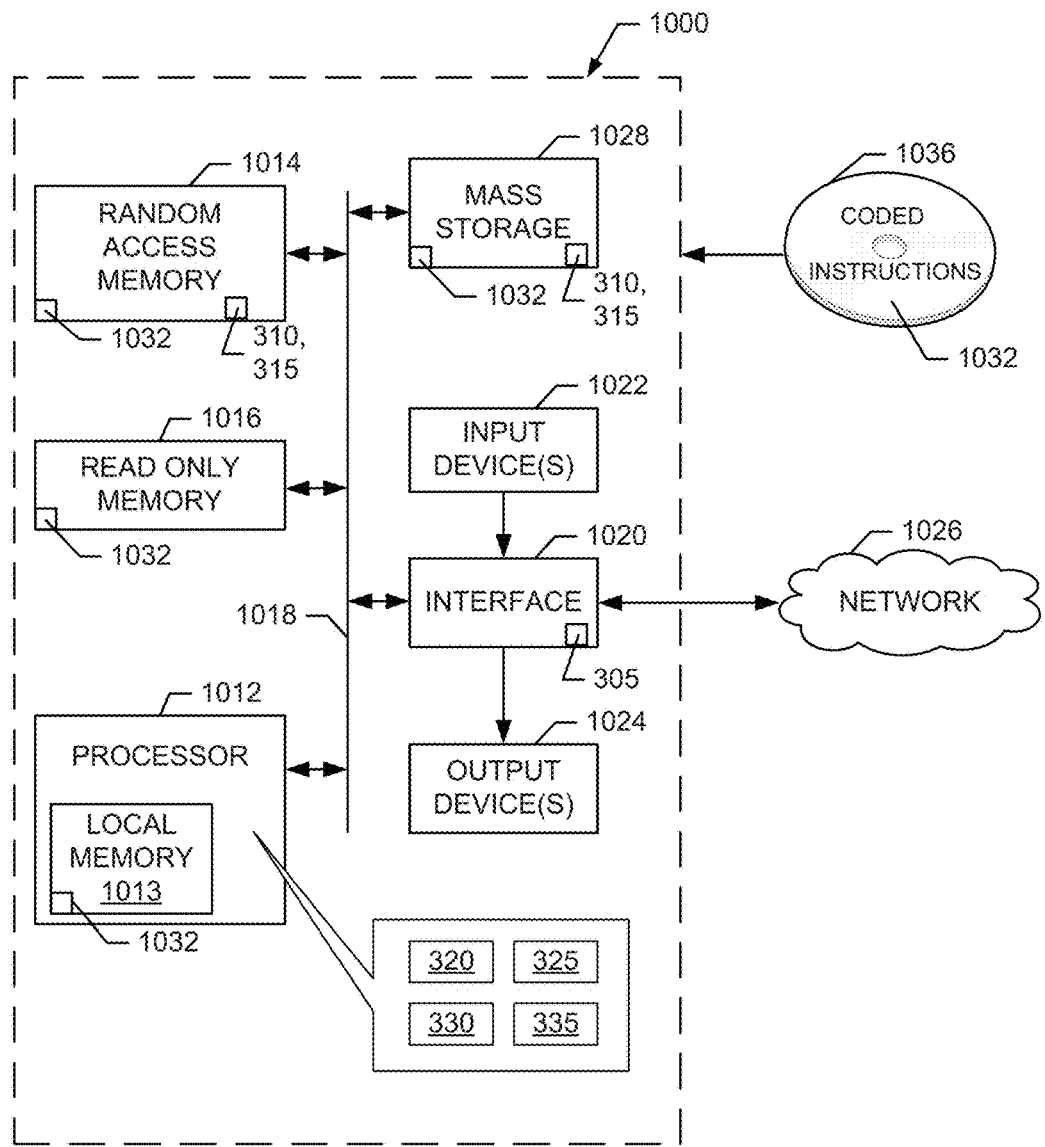
FIG. 10 is a block diagram of an example processor platform structured to execute the example machine readable instructions of FIGS. 5 and/or 6 to implement the example router of FIG. 3.

FIG. 10 is a block diagram of an example processor platform 1000 capable of executing the instructions of FIGS. 5 and/or 6 to implement the example router 110, the example network interface 305, the example routing information storage 310, the example network state information storage 315, the example state information reporter 320, the example fast reroute processor 325, the example distributed rerouting processor 330 and/or the example centralized rerouting processor 335 of FIG. 3. The processor platform 1000 can be, for example, a server, a personal computer, a mobile device (e.g., a cell phone, a smart phone, a tablet such as an iPad™), etc., or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. In the illustrated example of FIG. 10, the processor 1012 is configured to implement the example state information reporter 320, the example fast reroute processor 325, the example distributed rerouting processor 330 and the example centralized rerouting processor 335 of FIG. 3.

The processor 1012 of the illustrated example includes a local memory 1013 (e.g., a cache). The processor 1012 of the illustrated example is in communication with a main memory including a volatile memory 1014 and a non-volatile memory 1016 via a link 1018. The link 1018 may be implemented by a bus, one or more point-to-point connections, etc., or a combination thereof. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.). In the illustrated example of FIG. 10, the interface circuit 1020 is configured to implement the example network interface 305 of FIG. 3.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID (redundant array of independent disks) systems, and digital versatile disk (DVD) drives.

In the illustrated example of FIG. 10, one or more of the volatile memory 1014 and the mass storage device(s) 1028 is/are configured to implement the example routing information storage 310 and/or the example network state information storage 315 of FIG. 3.

Coded instructions 1032 corresponding to the instructions of FIGS. 5 and/or 6 may be stored in the mass storage device 1028, in the volatile memory 1014, in the non-volatile memory 1016, in the local memory 1013 and/or on a removable tangible computer readable storage medium, such as a CD or DVD 1036.

Figure 11:
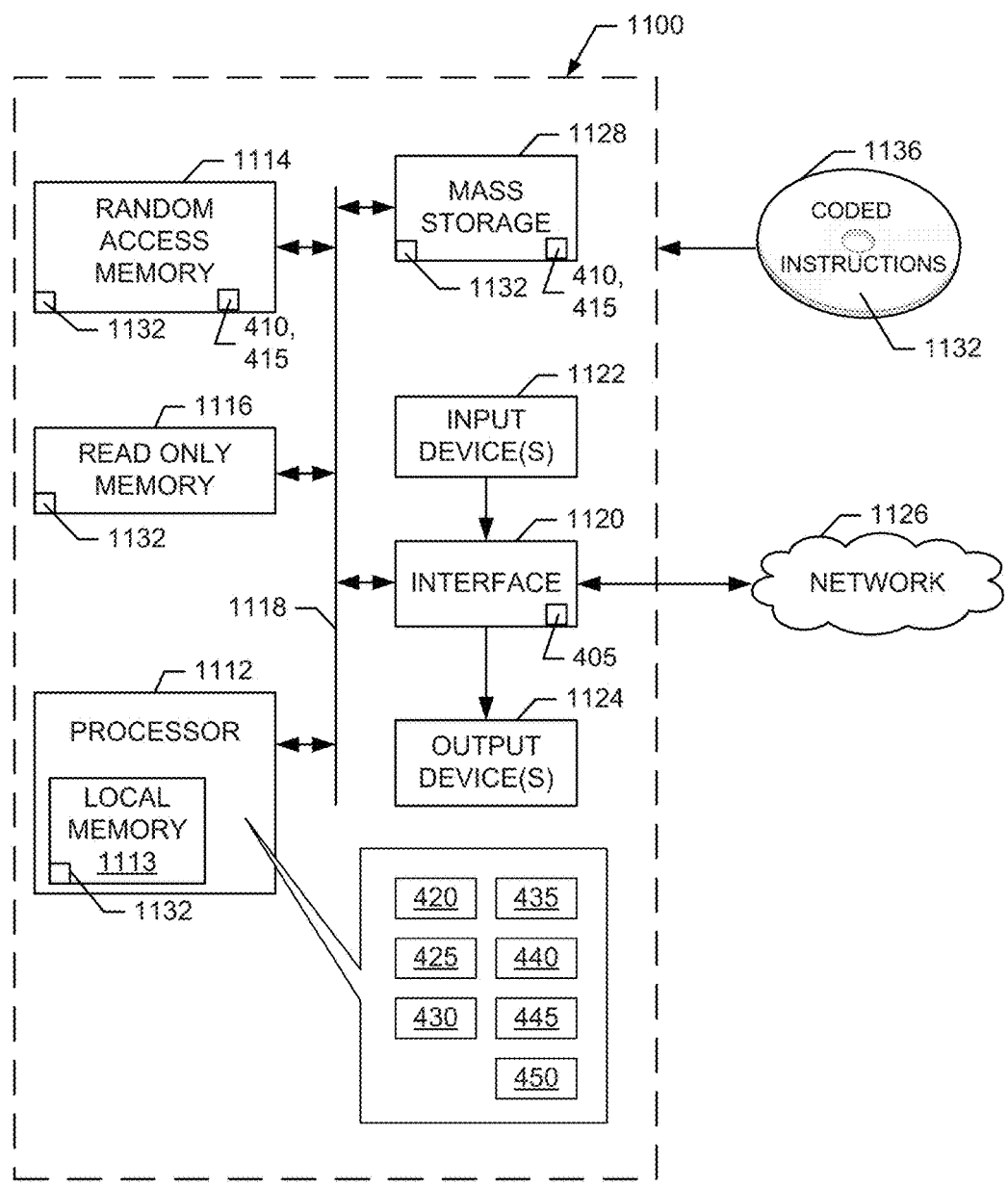
FIG. 11 is a block diagram of an example processor platform structured to execute the example machine readable instructions of FIGS. 5, 7, 8A-B and/or 9 to implement the example centralized rerouting controller of FIG. 4.

FIG. 11 is a block diagram of an example processor platform 1100 capable of executing the instructions of FIGS. 5, 7, 8A-B and/or 9 to implement the example centralized rerouting controller 120, the example network interface 405, the example routing information storage 410, the example network state information storage 415, the example state information processor 420, the example algorithm controller 425, the example tunnel determiner 430, the example tunnel order determiner 435, the example tunnel path determiner 440, the example quality metric evaluator 445 and/or the example routing information broadcaster 450 of FIG. 4. The processor platform 1100 can be, for example, a server, a personal computer, a mobile device (e.g., a cell phone, a smart phone, a tablet such as an iPad™), etc., or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. In the illustrated example of FIG. 11, the processor 1112 is configured to implement the example state information processor 420, the example algorithm controller 425, the example tunnel determiner 430, the example tunnel order determiner 435, the example tunnel path determiner 440, the example quality metric evaluator 445 and the example routing information broadcaster 450 of FIG. 4.

The processor 1112 of the illustrated example includes a local memory 1113 (e.g., a cache). The processor 1112 of the illustrated example is in communication with a main memory including a volatile memory 1114 and a non-volatile memory 1116 via a link 1118. The link 1118 may be implemented by a bus, one or more point-to-point connections, etc., or a combination thereof. The volatile memory 1114 may be implemented by SDRAM, DRAM, RDRAM and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a USB, and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface.

One or more output devices 1124 are also connected to the interface circuit 1020 of the illustrated example. The output devices 1124 can be implemented, for example, by display devices (e.g., a LED, an OLED, a liquid crystal display, a CRT, a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a DSL, a telephone line, coaxial cable, a cellular telephone system, etc.). In the illustrated example of FIG. 11, the interface circuit 1120 is configured to implement the example network interface 405 of FIG. 4.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and DVD drives.

In the illustrated example of FIG. 11, one or more of the volatile memory 1114 and the mass storage device(s) 1128 is/are configured to implement the example routing information storage 410 and/or the example network state information storage 415 of FIG. 4.

Coded instructions 1132 corresponding to the instructions of FIGS. 5, 7, 8A-B and/or 9 may be stored in the mass storage device 1128, in the volatile memory 1114, in the non-volatile memory 1116, in the local memory 1113 and/or on a removable tangible computer readable storage medium, such as a CD or DVD 1136.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A re-routing method for routers in a network, the re-routing method comprising:
   in response to detecting an event associated with routing traffic in the network, determining, by executing an instruction with a processor separate from the routers, a plurality of unique orderings of a plurality of tunnels, respective tunnels included in the plurality of tunnels corresponding to pairs of routers, at least one of the pairs of routers corresponding to more than one of the plurality of tunnels, and at least one of the pairs of routers to communicate via one or more intervening routers;
   for respective ones of the plurality of unique orderings, assigning, by executing an instruction with the processor, communication paths to carry respective traffic for the respective tunnels, the communication paths assigned to the respective tunnels in respective sequences specified in respective ones of the plurality of unique orderings; and
   when an overall quality metric determined using the communication paths assigned to the respective tunnels in a first sequence specified by a first unique ordering of the plurality of unique orderings satisfies a threshold, causing first routing information describing the communication paths assigned for the first unique ordering of the plurality of unique orderings to be sent to the routers to route the traffic.

2. The re-routing method of claim 1, wherein the overall quality metric corresponds to a total amount of bandwidth supported by the communication paths assigned to the respective tunnels in the first sequence specified by the first unique ordering of the plurality of unique orderings.

3. The re-routing method of claim 1, wherein the assigning of the communication paths to carry the respective traffic for the respective tunnels, includes:
   determining whether a first candidate communication path capable of supporting a first tunnel size associated with a first one of the plurality of tunnels is available in the network; and
   in response to determining the first candidate communication path is available:
      setting a routed bandwidth value for the first one of the plurality of tunnels equal to the first tunnel size; and
      decreasing available link capacities of a first set of network links included in the first candidate communication path by the first tunnel size.

4. The re-routing method of claim 3, further including, in response to determining that the first candidate communication path is not available:
   determining whether a second candidate communication path capable of supporting a portion of the first tunnel size associated with the first one of the plurality of tunnels is available in the network; and
   in response to determining the second candidate communication path is available:
      setting the routed bandwidth value for the first one of the plurality of tunnels equal to the portion of the first tunnel size; and
      decreasing available link capacities of a second set of network links included in the second candidate communication path by the portion of the first tunnel size.

5. The re-routing method of claim 1, wherein the overall quality metric characterizes an aggregate tunnel bandwidth in the network.

6. The re-routing method of claim 1, wherein the assigning of the communication paths to carry the respective traffic for the respective tunnels includes determining a remaining amount of link capacities of a set of network links included in the communication paths.

7. A tangible machine readable storage medium comprising instructions that, when executed, cause a processor to perform operations including:
   in response to detecting an event associated with routing traffic in a network, determining a plurality of unique orderings of a plurality of tunnels, respective tunnels of the plurality of tunnels corresponding to pairs of routers in the network, at least one of the pairs of routers corresponding to more than one of the plurality of tunnels, and at least one of the pairs of routers to communicate via one or more intervening routers;
   for respective ones of the plurality of unique orderings, assigning communication paths to carry respective traffic for the respective tunnels, the communication paths assigned to the respective tunnels in respective sequences specified in respective ones of the plurality of unique orderings; and
   when an overall quality metric determined using the communication paths assigned to the respective tunnels in a first sequence specified by a first unique ordering of the plurality of unique orderings satisfies a threshold, causing first routing information describing the communication paths assigned for the first unique ordering of the plurality of unique orderings to be sent to the routers in the network to route the traffic.

8. The tangible machine readable storage medium of claim 7, wherein the overall quality metric corresponds to a total amount of bandwidth supported by the communication paths assigned to the respective tunnels in the first sequence specified by the first unique ordering of the plurality of unique orderings.

9. The tangible machine readable storage medium of claim 7, wherein the assigning of the communication paths to carry respective traffic for the respective tunnels includes:
   determining whether a first candidate communication path capable of supporting a first tunnel size associated with a first one of the plurality of tunnels is available in the network; and
   in response to determining the first candidate communication path is available:
      setting a routed bandwidth value for the first one of the plurality of tunnels equal to the first tunnel size; and
      decreasing available link capacities of a first set of network links included in the first candidate communication path by the first tunnel size.

10. The tangible machine readable storage medium of claim 9, wherein the operations further include:
    in response to determining that the first candidate communication path is not available determining whether a second candidate communication path capable of supporting a portion of the first tunnel size associated with the first one of the plurality of tunnels is available in the network;
    in response to determining the second candidate communication path is available:
       setting the routed bandwidth value for the first one of the plurality of tunnels equal to the portion of the first tunnel size; and
       decreasing available link capacities of a second set of network links included in the second candidate communication path by the portion of the first tunnel size.

11. The tangible machine readable storage medium of claim 7, wherein the respective tunnels of the plurality of tunnels have respective target tunnel sizes.

12. The tangible machine readable storage medium of claim 7, wherein the assigning of the communication paths to carry the respective traffic for the respective tunnels includes determining a remaining amount of link capacities of a set of network links included in the communication paths.

13. The tangible machine readable storage medium of claim 7, wherein the overall quality metric characterizes an aggregate tunnel bandwidth in the network.

14. A controller to re-route tunnel traffic for routers in a network, the controller separate from the routers, the controller comprising:
    memory including machine readable instructions; and
    a processor to execute the machine readable instructions to perform operations including:
       in response to detecting an event associated with routing traffic in the network, determining a plurality of unique orderings of a plurality of tunnels, respective tunnels of the plurality of tunnels corresponding to pairs of routers in the network, at least one of the pairs of routers corresponding to more than one of the plurality of tunnels, and at least one of the pairs of routers coupled via one or more intervening routers;
       for respective ones of the plurality of unique orderings, assigning communication paths to carry respective traffic for the respective tunnels, the communication paths assigned to the respective tunnels in respective sequences specified in respective ones of the plurality of unique orderings; and
       when an overall quality metric determined using the communication paths assigned to the respective tunnels in a first sequence specified by a first unique ordering of the plurality of unique orderings satisfies a threshold, sending first routing information describing the communication paths assigned for the first unique ordering of the plurality of unique orderings to the routers in the network for routing the traffic.

15. The controller of claim 14, wherein the overall quality metric corresponds to a total amount of bandwidth supported by the communication paths assigned to the respective tunnels in the first sequence specified by the first unique ordering of the plurality of unique orderings.

16. The controller of claim 14, wherein the assigning of the communication paths to carry the respective traffic for the respective tunnels includes:
    determining whether a first candidate communication path capable of supporting a first tunnel size associated with a first one of the plurality of tunnels is available in the network; and
    in response to determining the first candidate communication path is available:
       setting a routed bandwidth value for the first one of the plurality of tunnels equal to the first tunnel size; and
       decreasing available link capacities of a first set of network links included in the first candidate communication path by the first tunnel size.

17. The controller of claim 16, wherein the operations further include:
    in response to determining that the first candidate communication path is not available, determining whether a second candidate communication path capable of supporting a portion of the first tunnel size associated with the first one of the plurality of tunnels is available in the network;
    in response to determining the second candidate communication path is available:
       setting the routed bandwidth value for the first one of the plurality of tunnels equal to the portion of the first tunnel size; and
       decreasing available link capacities of a second set of network links included in the second candidate communication path by the portion of the first tunnel size.

18. The controller of claim 14, wherein the respective tunnels of the plurality of tunnels have respective target tunnel sizes.

19. The controller of claim 14, wherein the assigning of the communication paths to carry the respective traffic for the respective tunnels includes determining a remaining amount of link capacities of a set of network links included in the communication paths.

20. The controller of claim 14, wherein the overall quality metric characterizes an aggregate tunnel bandwidth in the network.

* * * * *